(12) United States Patent
Motoyama

(10) Patent No.: US 10,645,248 B2
(45) Date of Patent: May 5, 2020

(54) IMAGE SCANNER

(71) Applicant: BROTHER KOGYO KABUSHIKI KAISHA, Nagoya-shi, Aichi-ken (JP)

(72) Inventor: Toshiki Motoyama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/246,620

(22) Filed: Jan. 14, 2019

(65) Prior Publication Data

US 2019/0222710 A1    Jul. 18, 2019

(30) Foreign Application Priority Data

Jan. 16, 2018 (JP) .................. 2018-004719

(51) Int. Cl.
*H04N 1/10* (2006.01)
*H04N 1/047* (2006.01)
*H04N 1/00* (2006.01)

(52) U.S. Cl.
CPC ....... *H04N 1/0473* (2013.01); *H04N 1/00718* (2013.01); *H04N 1/00745* (2013.01); *H04N 1/00777* (2013.01); *H04N 1/1043* (2013.01)

(58) Field of Classification Search
CPC ........... H04N 1/00702; H04N 1/00748; H04N 1/1013; H04N 1/12; H04N 1/193; H04N 2201/0081; H04N 2201/0458; H04N 1/0071; H04N 1/00718; H04N 1/00737; H04N 1/3878; H04N 2201/04737; G06K 9/6202; G06T 7/13; G06T 7/44; G06T 7/74
See application file for complete search history.

(56) References Cited

U.S. PATENT DOCUMENTS

| 5,014,123 A * | 5/1991 | Imoto | H04N 1/00267 358/506 |
| 2004/0165224 A1* | 8/2004 | Allen | H04N 1/107 358/474 |
| 2007/0273935 A1* | 11/2007 | Ide | H04N 1/00681 358/474 |

(Continued)

FOREIGN PATENT DOCUMENTS

JP    H09-27909 A    1/1997

*Primary Examiner* — Negussie Worku

(74) *Attorney, Agent, or Firm* — Scully, Scott, Murphy & Presser, PC

(57) ABSTRACT

A controller executes area defining processing for defining a middle area and two side areas, and ending processing. In a case where the document leading edge extends parallel to a main scanning direction, the controller executes the ending processing for non-skewed document. In a case where the document leading edge does not extend parallel to the main scanning direction, the controller executes the ending processing for skewed document. In which, the controller determines, in the middle area and the side areas, first, second, and third change positions, respectively, at each of which a type of a target read image data line changes from document data to document cover data, determines, based on the first change position and the second change position, whether a document has a rectangular shape, and ends the reading operation based on the third change position and the determination result as to the document shape.

6 Claims, 29 Drawing Sheets

(56) References Cited

U.S. PATENT DOCUMENTS

| | | | |
|---|---|---|---|
| 2008/0225355 A1* | 9/2008 | Kagami | H04N 1/1013 358/496 |
| 2009/0185240 A1* | 7/2009 | Kato | H04N 1/00681 358/474 |
| 2009/0296167 A1* | 12/2009 | Motoyama | H04N 1/00681 358/474 |
| 2013/0223732 A1* | 8/2013 | Motoyama | G06K 9/00456 382/165 |
| 2015/0116787 A1* | 4/2015 | Kim | G02B 7/00 358/406 |
| 2015/0281487 A1* | 10/2015 | Motoyama | H04N 1/00822 358/1.13 |
| 2016/0057301 A1* | 2/2016 | Motoyama | H04N 1/3263 358/406 |
| 2016/0292503 A1* | 10/2016 | Motoyama | G06T 7/73 |
| 2017/0272609 A1* | 9/2017 | Motoyama | H04N 1/40012 |
| 2018/0150958 A1* | 5/2018 | Motoyama | G06T 7/11 |
| 2018/0227450 A1* | 8/2018 | Motoyama | H04N 1/00708 |
| 2019/0100358 A1* | 4/2019 | Takayanagi | B60K 15/00 |
| 2019/0124225 A1* | 4/2019 | Fujii | H04N 1/00718 |
| 2019/0124226 A1* | 4/2019 | Fujii | H04N 1/00748 |

* cited by examiner

FIG.26B
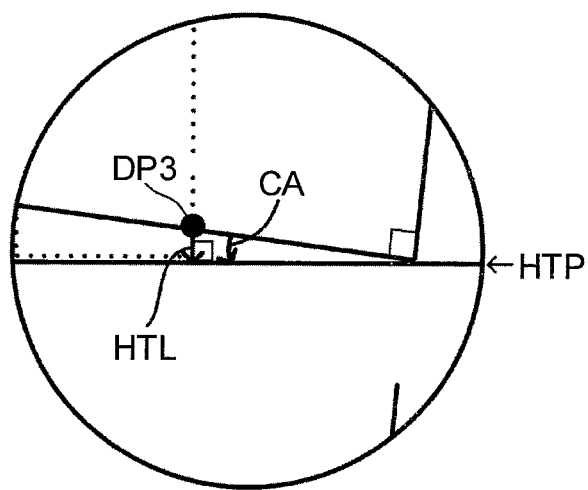
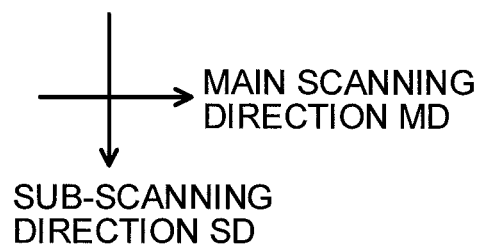

FIG.27B
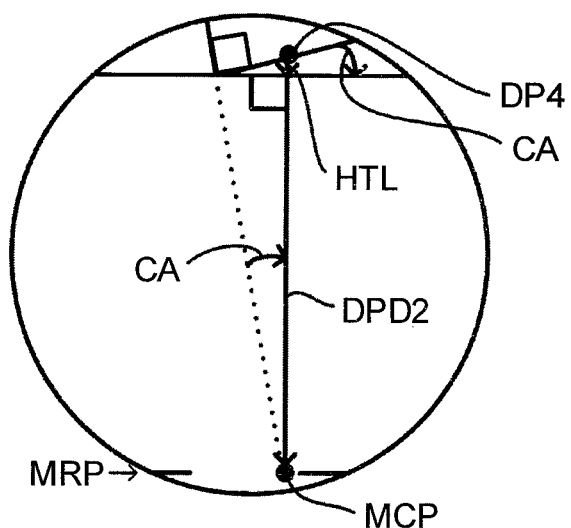
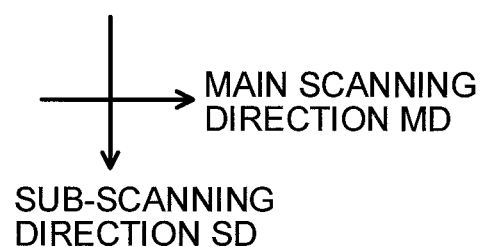
MAIN SCANNING DIRECTION MD
SUB-SCANNING DIRECTION SD

IMAGE SCANNER

CROSS-REFERENCE TO RELATED APPLICATION

This application claims priority from Japanese Patent Application No. 2018-004719 filed on Jan. 16, 2018, the content of which is incorporated herein by reference in its entirety.

TECHNICAL FIELD

Aspects described herein relate to an image scanner.

BACKGROUND

A known image scanner reads a document by moving, along a sub-scanning direction, a line sensor extending in a main scanning direction. The image scanner detects the presence or absence of a document on a document table by comparing between data read at a specified position with respect to the main scanning direction and a threshold determined based on color strength of white document background. In response to the line sensor reaching a trailing edge of the document while moving along the sub-scanning direction, the color strength of data read at the specified position indicates the color strength other than the color strength of the white document background. In response to such color strength change, the image scanner stops reading the document.

SUMMARY

In some cases, a document may be improperly placed on the document table without being aligned with a document alignment member. In such a case, no portion of the document may be positioned at the specified position where the document alignment member is provided. Such misalignment may cause data read at the specified position not to have the color strength of the white document background and may thus cause the image scanner to determine erroneously that no document is placed on the document table.

Accordingly, some embodiments of the disclosure provide for an image scanner that may read a document successfully if the document is placed on a document table of the image scanner improperly.

In one aspect of the disclosure, an image scanner comprises a document table configured to support a document; a document cover configured to be opened and closed selectively to change between an open state in which the document cover exposes the document table and a closed state in which the document cover covers the document table; a reader including a line image sensor extending along a main scanning direction, the reader configured to read an image using the line image sensor to generate a plurality of read image data items, wherein the reader is configured to, in response to reading the document supported by the document table, generate, as one of the plurality of read image data items, document data representing a portion of the document, and in response to reading a surface of the document cover in the closed state, generate, as another of the plurality of read image data items, document cover data representing a portion of the document cover; a moving unit configured to move the line image sensor in a sub-scanning direction; and a controller configured to: in starting processing, start a reading operation for generating the plurality of read image data items by the reader while causing the moving unit to move the line image sensor downstream in the sub-scanning direction; in leading-edge detection processing, detecting, based on read leading-edge image data that consists of some of the plurality of read image data items and is generated by the reading operation executed from a reading start position where the line image sensor is located at the start of the starting processing to a leading-edge area end position located downstream away from the reading start position by a first predetermined distance in the sub-scanning direction, a document leading edge extending with respect to the main scanning direction and two document side edges each extending with respect to the sub-scanning direction; in area defining processing, define, based on the document side edges, a middle area at a middle portion of the document supported by the document table in the main scanning direction and two side areas each between a corresponding one of the document side edges and the middle area and closer to the respective document side edges than to the middle area; and in ending processing: in a case where the document leading edge extends parallel to the main scanning direction, apply ending processing for non-skewed document to a target read image data line to end the reading operation, the target read image data line consisting of some of the plurality of read image data items and located downstream from the leading-edge area end position in the sub-scanning direction; and in a case where the document leading-edge of the document does not extend parallel to the main scanning direction, apply ending processing for skewed document to the target read image data line to end the reading operation, wherein, in the ending processing for non-skewed document, the controller is configured to end the reading operation in response to change of a type of the target read image data line from the document data to the document cover data in all of the middle area and the side areas in the sub-scanning direction; and wherein, in the ending processing for skewed document, the controller is configured to: determine, in the middle area and the side areas, sequentially a first change position, a second change position, and a third change position in the sub-scanning direction, at each of which the type of the target read image data line changes from the document data to the document cover data in the sub-scanning direction; determine, based on the first change position and the second change position, whether the document supported by the document table has a rectangular shape; and based on the determination result as to whether the document supported by the document table has a rectangular shape and the third change position, end the reading operation.

According to one or more aspects of the disclosure, in either of cases where a document is placed on the document table with its leading edge extending parallel to the main scanning direction and where a document is placed on the document table with its leading edge extending not parallel to the main scanning direction, the image scanner may execute respective appropriate different ending processing to read the document successfully.

BRIEF DESCRIPTION OF THE DRAWINGS

Aspects of the disclosure are illustrated by way of example and not by limitation in the accompanying figures in which like reference characters indicate similar elements.

FIG. 26B is an enlarged view of a portion including a third detection position of FIG. 26A in the illustrative embodiment according to one or more aspects of the disclosure.

FIG. 27B is an enlarged view of a portion including a fourth detection position of FIG. 27A in the illustrative embodiment according to one or more aspects of the disclosure.

DETAILED DESCRIPTION

Configuration of Image Scanner SM

Figure 1:
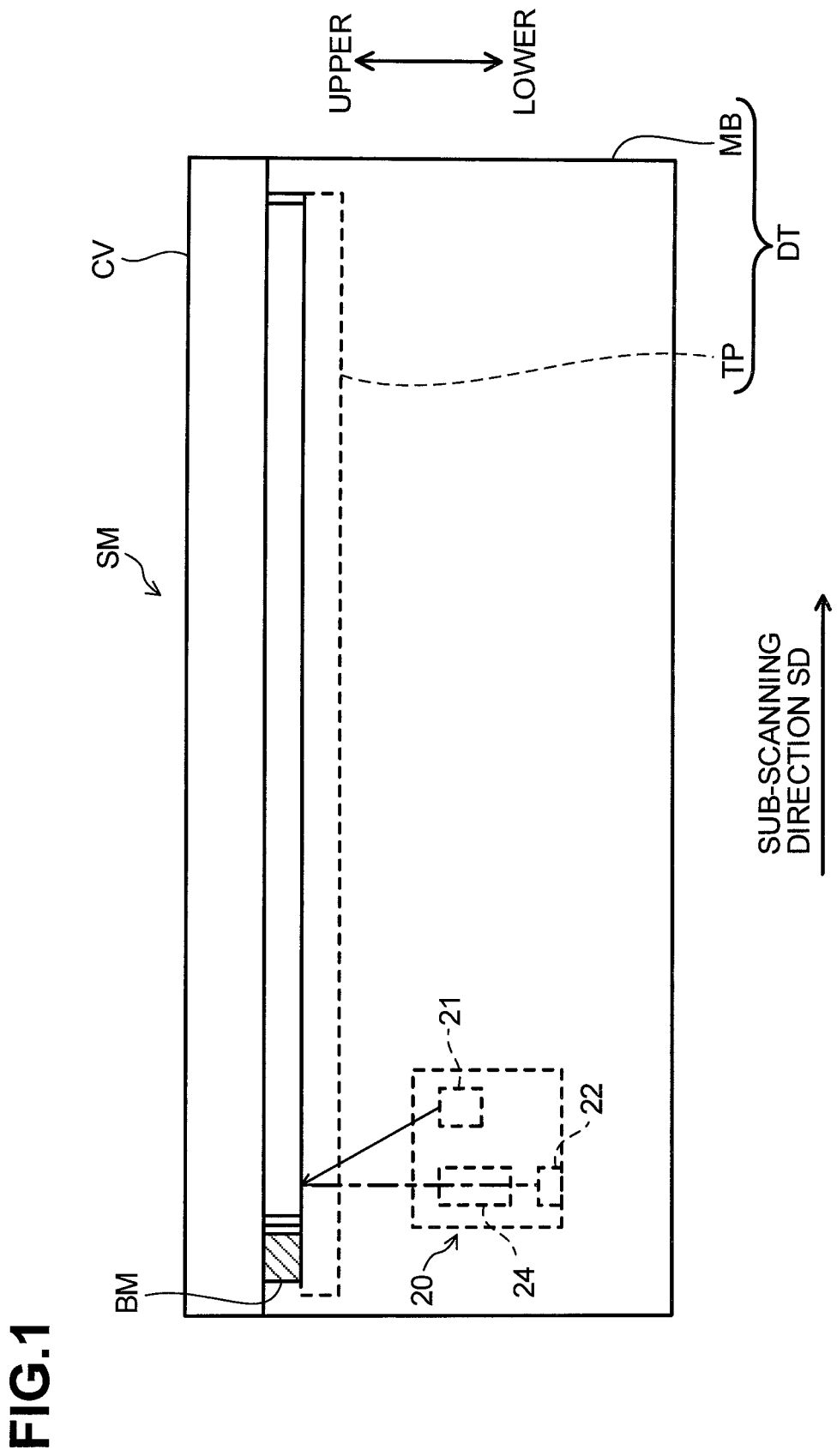
FIG. 1 illustrates an internal configuration of an image scanner in an illustrative embodiment according to one or more aspects of the disclosure.

Referring to appropriate ones of the accompanying drawings, a configuration of an image scanner SM will be described. The right side of the drawing sheet of FIG. 1 may be defined as downstream in a sub-scanning direction SD. The bottom side of the drawing sheet of FIG. 2 may be defined as downstream in a main scanning direction MD. The right side of the drawing sheet of FIG. 2 may be defined as downstream in the sub-scanning direction.

The image scanner SM includes a document table DT and a document cover CV. The document table DT includes a main body MB and a transparent plate TP. The main body MB may be a housing that accommodates various components and members such as the transparent plate TP and a reader 20. As indicated by a dot-and-dashed line in FIG. 2, the transparent plate TP is housed in the main body MB and fixed to the main body MB. The transparent plate TP may support a document GS to be read. The document cover CV includes a plurality of, for example, two, pivots 28 on one side (e.g., a far side in a direction perpendicular to the drawing surface of FIG. 1 or an upstream end of the main body MB in the main scanning direction MD) of the main body MB. The document cover CV is configured to be opened and closed from the other side opposite to the one side of the main body MB (e.g., a near side in the direction perpendicular to the drawing surface of FIG. 1 or a downstream end of the main body MB in the main scanning direction MD). The document cover CV is configured to change between an open state and a closed state. In the open state, the document cover CV exposes the document table DT. In the closed state, the document cover CV covers the document table DT.

The image scanner SM further includes the reader 20. The reader 20 is disposed below the transparent plate TP in the main body MB. The reader 20 is movable relative to the main body MB along the sub-scanning direction SD (e.g., a lateral direction in FIG. 1). The reader 20 is configured to read a document GS supported by the transparent plate TP. The reader 20 may be a contact image sensor ("CIS"). More specifically, for example, the reader 20 includes a light emitter 21, a rod lens 24, and a light receiver 22. The light emitter 21 includes, for example, red, green, and blue light-emitting diodes. The light emitter 21 is configured to emit light toward the transparent plate PT. The rod lens 24 is configured to receive reflected light of light emitted by the light emitter 21 and form an image on the light receiver 22 based on the received light.

The light receiver 22 includes a plurality of photoelectric conversion elements 23 arrayed along the main scanning direction MD. The light receiver 22 includes an analog shift register and an amplifier built therein. Output from each photoelectric conversion elements 23 corresponds to an amount of light received at each pixel in the main scanning direction MD. A leading pixel of the photoelectric conversion elements 23 may be located at a most upstream position in the main scanning direction MD. A last pixel of the photoelectric conversion elements 23 may be located at a most downstream position in the main scanning direction MD. In the illustrative embodiment, a single line may be a pixel group including a plurality of pixels arrayed in the main scanning direction MD, starting with the leading pixel and ending with the last pixel.

Figure 2:
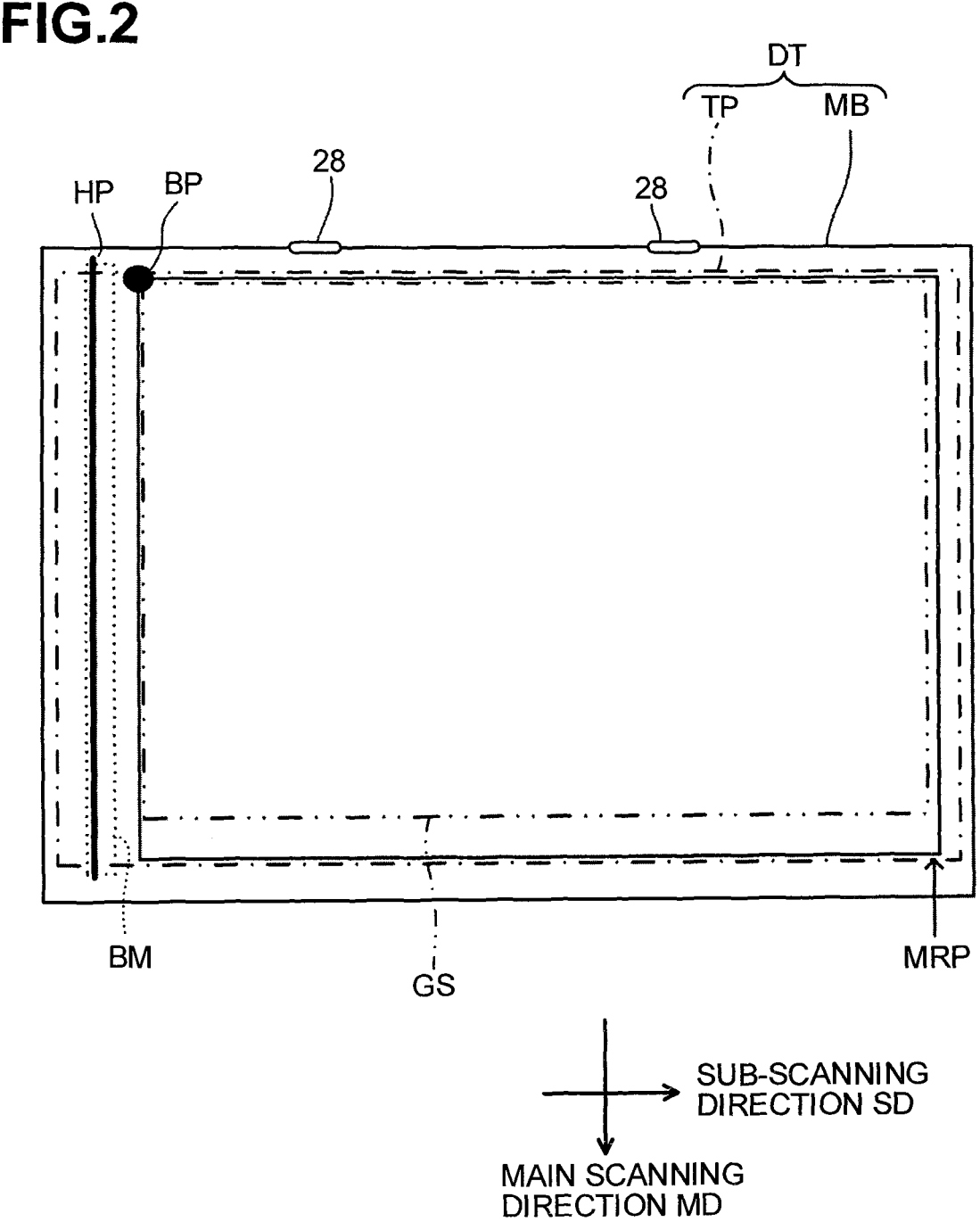
FIG. 2 is a top view of a document table in the illustrative embodiment according to one or more aspects of the disclosure.

As illustrated in FIG. 2, the document table DT has an upper surface that includes an upper surface of the main body MB and an exposed surface of the transparent plate TP that may face the document cover CV. The main body MB may be black. The pivots 28 are located at respective positions on the upstream end of the main body MB in the main scanning direction MD. As illustrated in FIG. 2, the transparent plate TP (indicated by a dotted-and-dashed line) has a rectangular shape having longer sides and shorter sides. The longer sides extend along the sub-scanning direction, and the shorter sides extend along the main scanning direction MD. The exposed surface of the transparent plate TP that may face the document cover CV is indicated by a sold line in FIG. 2. A document GS may be placed on the transparent plate TP relative to a reference position BP. The pivots 28 are rotatable to enable the document cover CV to be opened and closed.

The reference position BP may be defined on the exposed surface of the transparent plate TP. The reference position BP may be a most upstream position in the main scanning direction MD and a most upstream position in the sub-scanning direction SD. A most downstream position in the sub-scanning direction SD on the exposed surface of the transparent plate TP may be a furthest readable position MRP. The image scanner SM is configured to read an image in a readable range from the reference position BP in the sub-scanning direction SD to the furthest readable position MRP. The location of a first line FL in the sub-scanning direction SD may be at the reference position BP in the sub-scanning direction SD.

The image scanner SM further includes a reference member BM. The reference member BM is fixed to the upper surface of the transparent plate TP. The reference member BM is disposed at an upstream end portion of the transparent plate TP in the sub-scanning direction SD (e.g., a left end portion of the transparent plate TP in FIG. 2). The reference member BM may be a white member extending along the main scanning direction MD. A home position HP may be defined on the reference member BM with respect to the sub-scanning direction SD. The reader 20 is configured to move along the sub-scanning direction SD relative to the home position HP.

Electrical Configuration of Image Scanner SM

Figure 3:
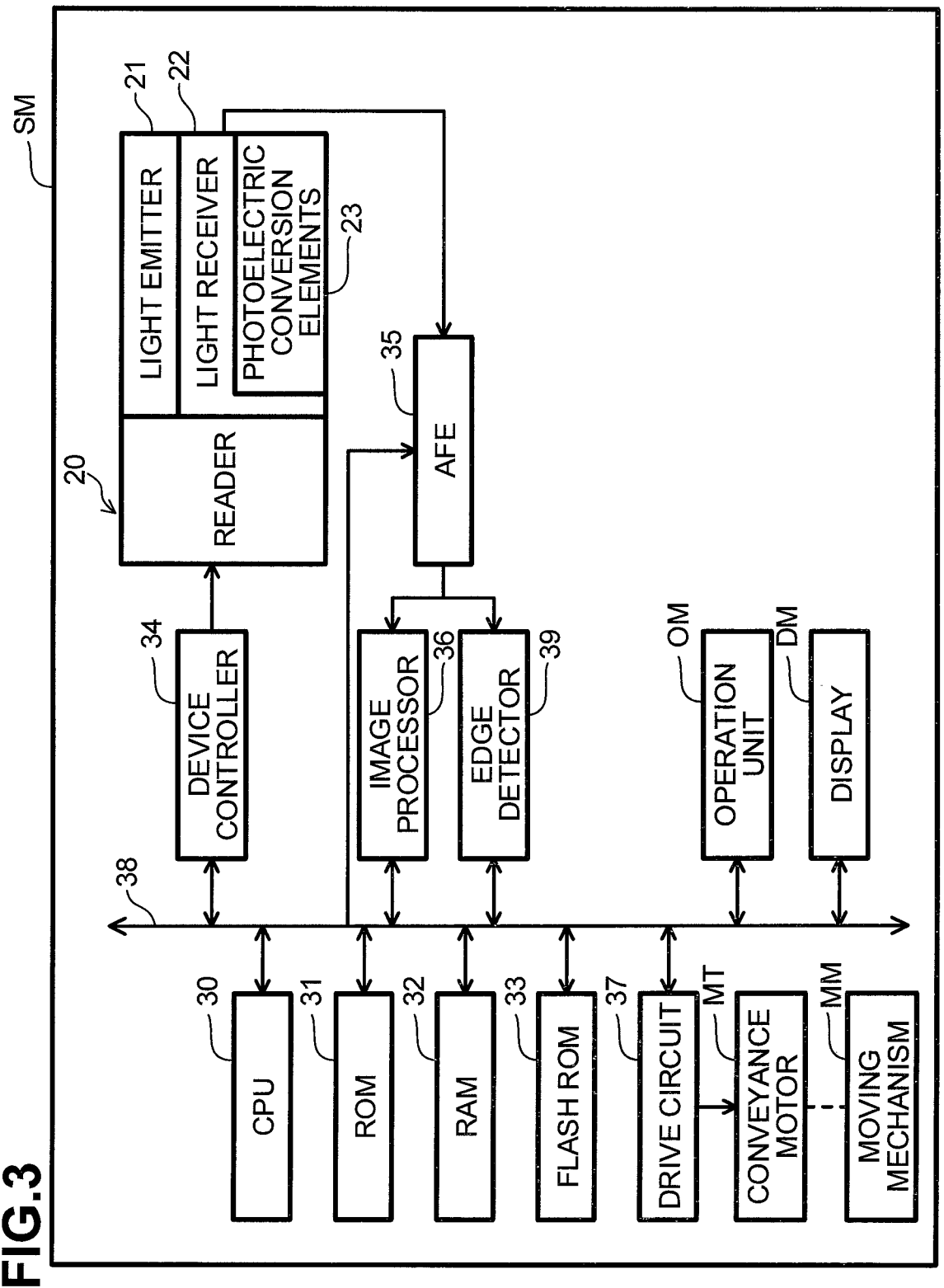
FIG. 3 is a block diagram illustrating an electrical configuration of the image scanner in the illustrative embodiment according to one or more aspects of the disclosure.

Referring to FIG. 3, an electrical configuration of the image scanner SM will be described. The image scanner SM includes, as main constituent elements, a CPU 30, a ROM 31, a RAM 32, a flash ROM 33, a device controller 34, an analog front end ("AFE") 35, an image processor 36, an edge detector 39, and a drive circuit 37. These constituent elements are connected to an operation unit OM and a display DM via a bus 38. The operation unit OM includes a plurality of keys and buttons such as a start button and an OK button. The operation unit OM enables a user to input various instructions into the image scanner SM. The display DM is configured to display various information thereon.

The ROM 31 stores various programs for enabling the image scanner SM to execute various operations such as main processing in reading and subroutines in each main processing. The CPU 30 is configured to control the respective units and components in accordance with appropriate one or more programs read from the ROM 31. The flash ROM 33 may be a readable/writable nonvolatile memory. The flash ROM 33 is configured to store various data generated in control processing executed by the CPU 30, for example, various data acquired in the main processing in reading. The RAM 32 is configured to temporarily store calculation results generated in control processing executed by the CPU 30.

The device controller 34 is connected to the reader 20. The device controller 34 is configured to, in accordance with instructions provided by the CPU 30, transmit various signals to the light emitter 21. The various signals include, for example, a signal for controlling turning on or off of the light emitter 21 and a signal for controlling current flowing through the light emitter 21. The device controller 34 is further configured to, in accordance with instructions provided by the CPU 30, transmit a serial-in signal SI and a clock signal CLK to the light receiver 22. The serial-in signal SI may be for transferring electrical signals outputted by the photoelectric conversion elements 23 to a shift register simultaneously. The clock signal CLK may be for sequentially outputting electrical signals from the shift register. In response to receipt of such signals from the device controller 34, the reader 20 turns the light emitter 21 on and transmits, to the AFE 35, an analog signal responsive to an amount of light received by the light receiver 22.

The AEF 35 is connected to the reader 20. The AEF 35 is configured to, in accordance with instructions provided by the CPU 30, convert an analog signal received from the reader 20 into a digital signal. The AEF 35 has a predetermined input range and resolution. For example, the resolution corresponds to a grayscale from "0" to "1023" in terms of 10 bits. In such a case, the AFE 35 converts an analog signal received from the reader 20 into to grayscale data of 10 bits (e.g., 0 to 1023) as digital data. The digital data converted by the AEF 35 is transmitted to the image processor 36 and the edge detector 39.

The image processor 36 includes an ASIC that may be an IC designed for image processing. The image processor 36 is configured to apply image processing to digital data. The image processing may be correction processing such as gamma correction. The image processor 36 is configured to apply such image processing to digital data to generate digital image data. The generated digital image data is stored in the RAM 32 via the bus 38.

The edge detector 39 is configured to apply known edge detection, for example, the Sobel filter, to digital data to generate black and white data WBD. The edge detector 39 generates black and white data WBD. More specifically, for example, the edge detector 39 generates black and white data WBD having value "1" for an edge pixel and black and white data WBD having value "0" for a non-edge pixel. The generated black and white data WBD are stored in the RAM 32. In the illustrative embodiment, in response to the image scanner SM reading a background color of a document GS, the edge detector 39 may generate black and white data WBD having value "1" at the rate of 5%. In response to the image scanner SM reading a surface color of the document cover CV, the edge detector 39 may generate black and white data WBD having value "0" at the rate of less than 1%. Conversely, the black and white data WBD having value "1" generated at the rate of 5% may be data generated in response to the image scanner SM reading a background color of a document GS. The black and white data WBD having value "0" generated at the rate of less than 1% may be data generated in response to the image scanner SM reading the surface color of the document cover CV.

The drive circuit 37 is connected to a conveyance motor MT. The drive circuit 37 is configured to drive the conveyance motor MT in accordance with a drive instruction provided by the CPU 30. The drive circuit 37 is configured to rotate the conveyance motor MT in accordance with a rotation amount and direction specified by the drive instruction. As the conveyance motor MT rotates by a predetermined amount, a moving mechanism MM rotates by a predetermined angle and moves the reader 20 in the sub-scanning direction SD by a predetermined distance.

Operation of Image Scanner SM

Main Processing in Reading

Figure 4:
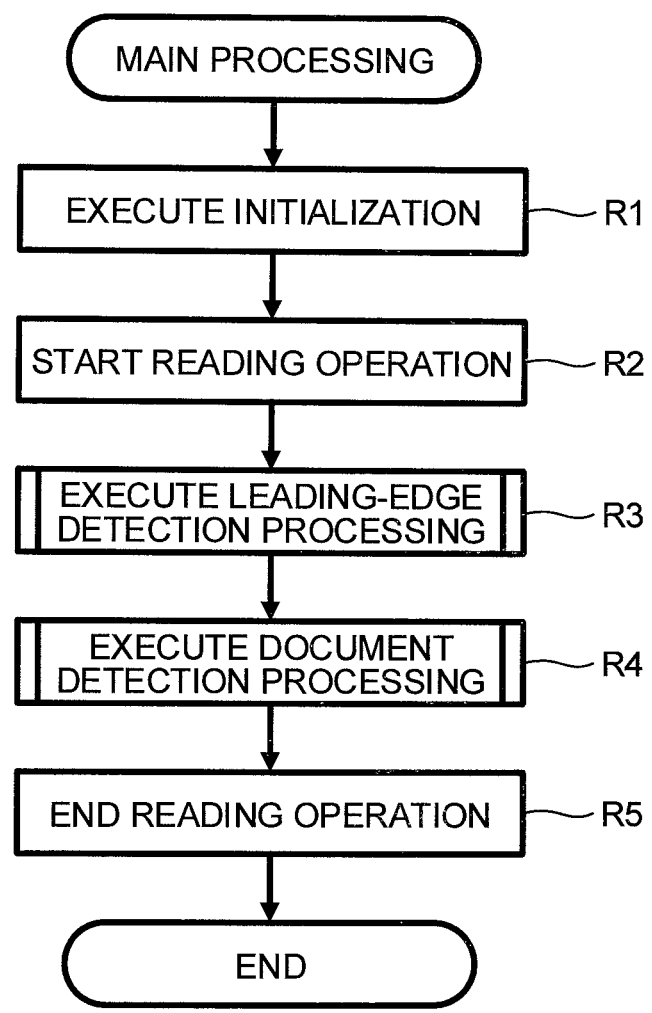
FIG. 4 is a flowchart of main processing in reading in the illustrative embodiment according to one or more aspects of the disclosure.

Referring to appropriate ones of the accompanying drawings, operation of the image scanner SM will be described. The image scanner SM mainly executes the main processing in reading (hereinafter, simply referred to as the "main processing") for reading a document GS. As illustrated in FIG. 4, the main processing includes processing of steps R1 to R5. Each processing of steps R1 to R5 is executed by the CPU 30.

The main processing starts in response to a user pressing a reading start button of the operation unit OM after placing a document GS on the transparent plate TP. That is, in response to receipt of an instruction provided by pressing of the reading start button, the CPU 30 starts the main processing. In the illustrative embodiment, referring to FIGS. 25, 26A, 26B, 27A, and 27B, the main processing will be described by taking the following cases as examples: a case where a document GS is placed on the transparent plate TP with being properly positioned and oriented (i.e., document GS is not skewed toward any direction relative to the transparent plate TP); a case where a document GS is placed on the transparent plate TP with being rotated or skewed clockwise relative to the transparent plate TP; and a case where a document GS is placed on the transparent plate TP with being rotated or skewed counterclockwise relative to the transparent plate TP.

In step R1, the CPU 30 initializes the device controller 34 and the image processor 36. More specifically, for example, the CPU 30 receives, from the flash ROM 33, setting values of the clock signal CLK and the serial-in signal SI that correspond to a reading resolution of 300 dpi in the main scanning direction MD and a reading resolution of 300 dpi in the sub-scanning direction SD, and sets the setting values to the device controller 34. The CPU 30 further receives, from the flash ROM 33, setting values for reading with a reading resolution of 300 dpi in the main scanning direction MD and a reading resolution of 300 dpi in the sub-scanning direction SD, and sets the setting values to the image processor 36. The CPU 30 sets a value "350" to a total line TLN and stores this information in the RAM 32. The CPU 30 turns off a "no skew" flag DFG, a first edge flag EFG1, a second edge flag EFG2, a third edge flag EFG3, a fourth edge flag EFG4, and a reading end flag REFG, and turns on a specified flag SFG. The CPU 30 stores this flag information in the RAM 32. In the illustrative embodiment, the value "350" set to the total line TLN may indicate a location of leading-edge data end position HADP that may correspond to a location of the data end of leading-edge data HA in the sub-scanning direction SD, i.e., a distance between the first line FL and the leading-edge data end position HADP.

In step R2, the CPU 30 starts a reading operation. More specifically, for example, the CPU 30 provides a drive instruction to the drive circuit 37 to move the reader 20 to the reference position BP. The CPU 30 provides instructions to the drive circuit 37 and the device controller 34 to start the reading operation. In the reading operation, the reader 20 reads a document GS while moving downstream from the reference position BP in the sub-scanning direction SD. In response to the start of the reading operation, digital image data and black and white data WBD are stored in the RAM 32.

Figure 25:
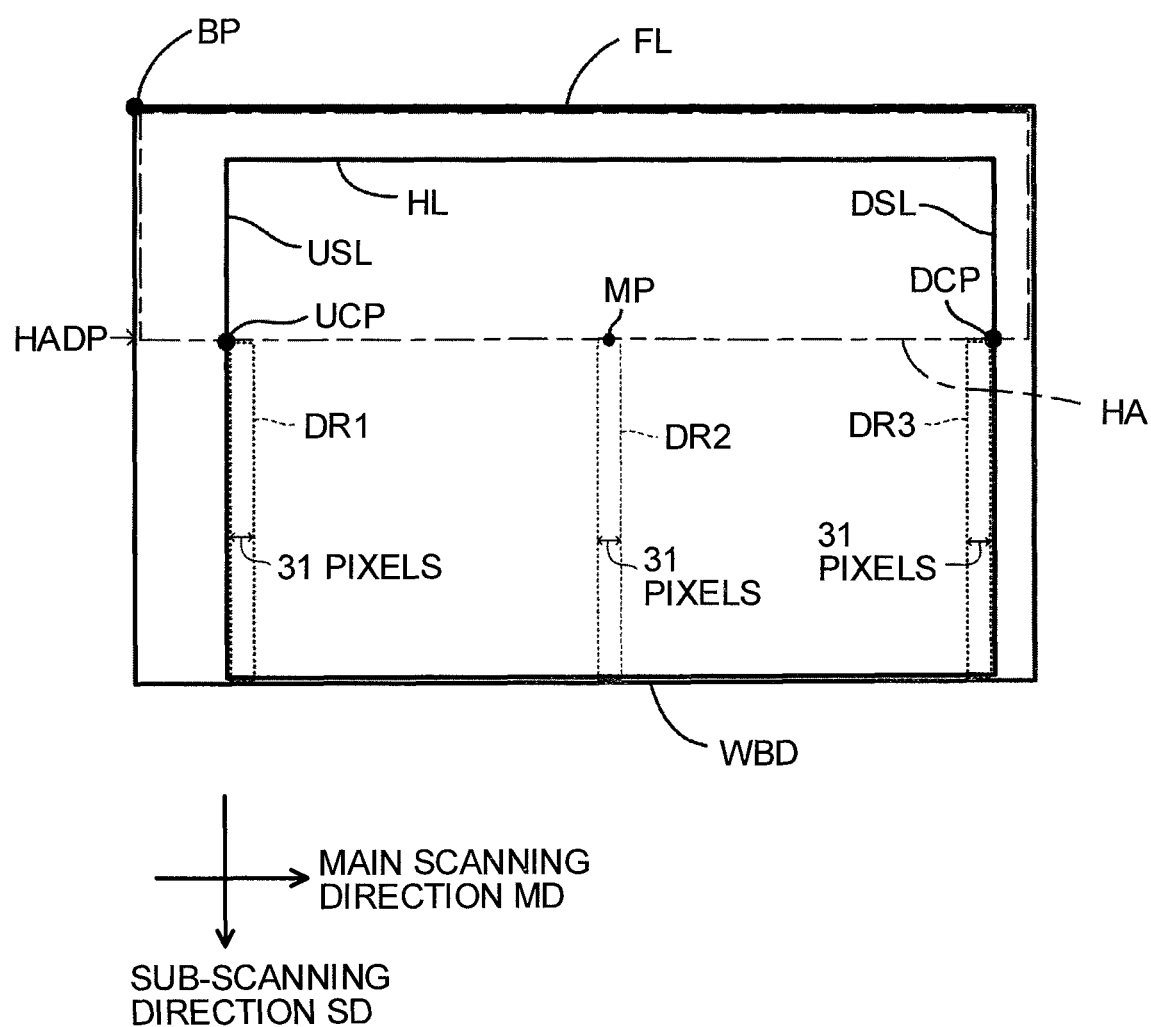
FIG. 25 is a diagram for explaining black and white data and various information such as detection areas in a case where a document is placed on a transparent plate without being skewed toward any direction relative to the transparent plate in the illustrative embodiment according to one or more aspects of the disclosure.
Figure 26A:
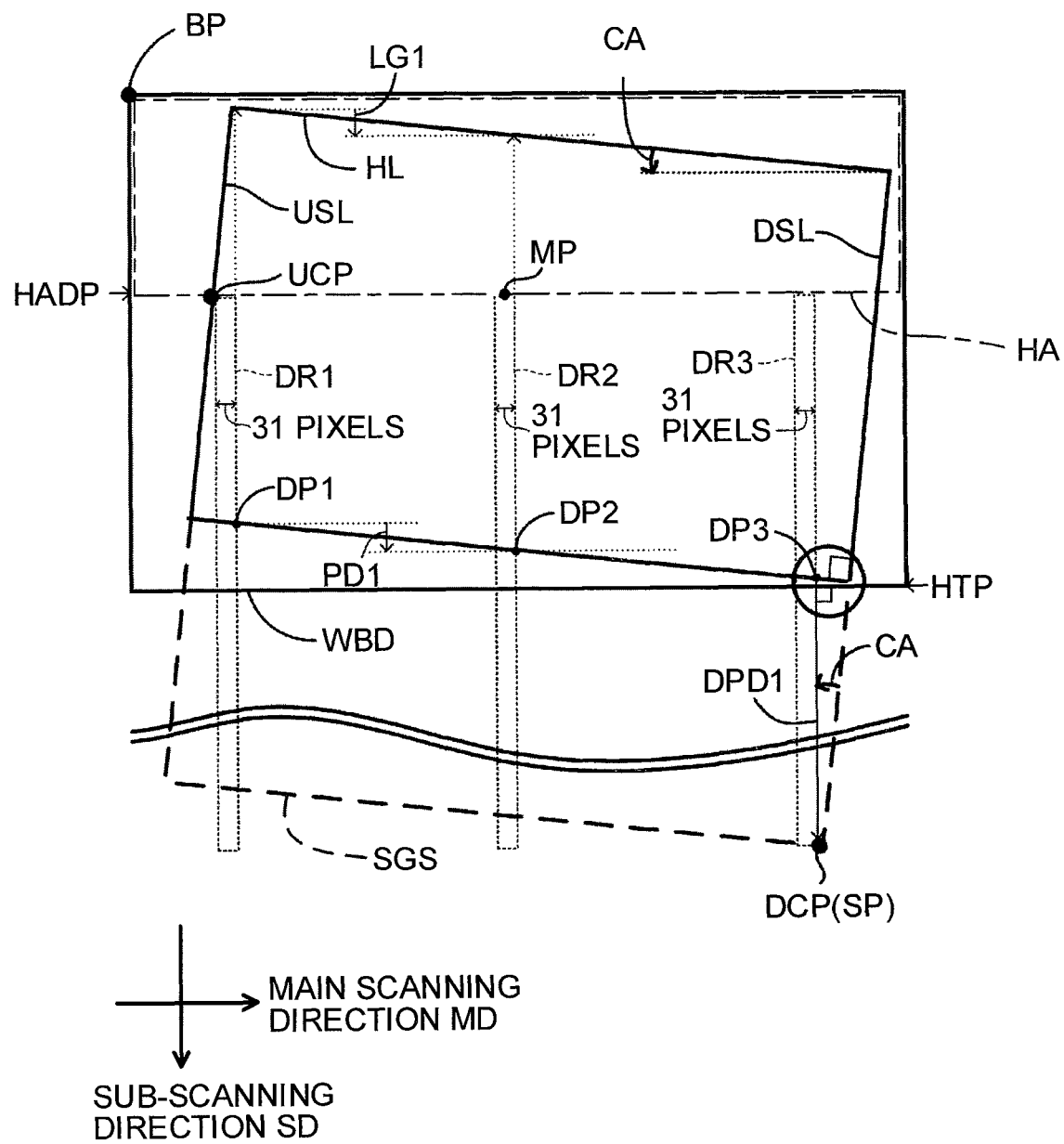
FIG. 26A is a diagram for explaining black and white data and various information such as detection areas in a case where a document is placed on the transparent plate with being rotated or skewed clockwise relative to the transparent plate in the illustrative embodiment according to one or more aspects of the disclosure.
Figure 27A:
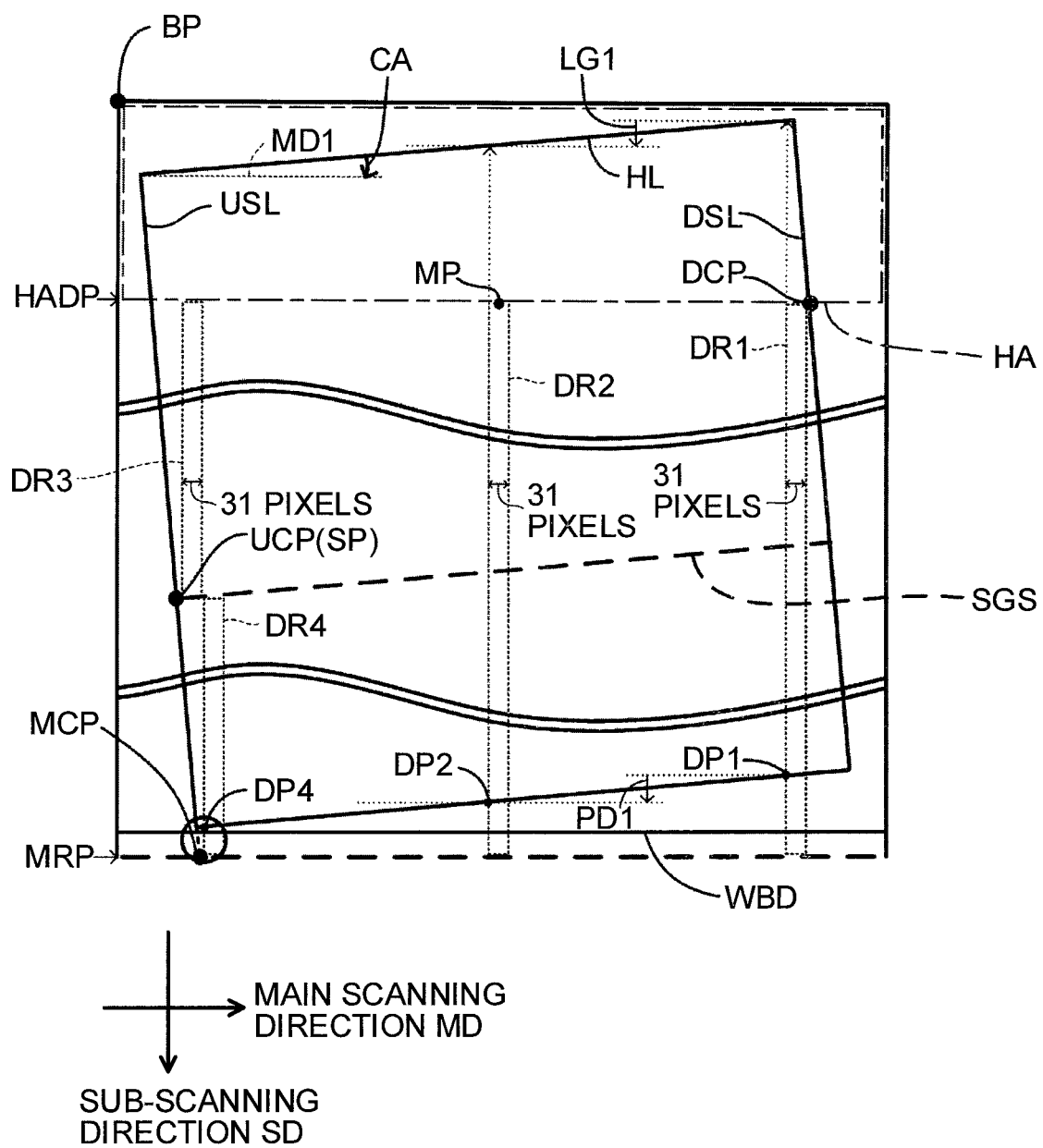
FIG. 27A is a diagram for explaining black and white data and various information such as detection areas in a case where a document is placed on the transparent plate with being rotated or skewed counterclockwise relative to the transparent plate.

In step R3, the CPU 30 executes leading-edge detection processing. More specifically, for example, the CPU 30 determines a leading edge HL, an upstream edge USL, a downstream edge DSL, an upstream reference point position UCP, a downstream reference point position DCP, and a skewed angle CA, and stores this information in the RAM 32. As illustrated in FIGS. 25, 26A, and 27A, the CPU 30 defines a detection area DR1, a detection area DR2, a detection area DR3, and a specified position SP, and stores this information to the RAM 32.

In step R4, the CPU 30 executes document detection processing. More specifically, for example, the CPU 30 calculates a first edge count EN1, a second edge count EN2, and a third edge count EN3, and stores this information in the RAM 32. Based on the calculation results of the first edge count EN1, the second edge count EN2, and the third edge count EN3, the CPU 30 executes non-skewed document detection processing or skewed document detection processing. In the illustrative embodiment, the CPU 30 may execute the non-skewed document detection processing for a single line or the skewed document detection processing for a single line by taking substantially the same time duration as the time duration required for reading an image of a single line.

In step R5, the CPU 30 ends the reading operation. More specifically, for example, the CPU 30 provides instructions to the drive circuit 37 and the device controller 34 to end the reading operation. After stopping the driving of the reader 20, the CPU 30 moves the reader 20 to the home position HP. In response to the end of step R5, the main processing ends.

Leading-Edge Detection Processing

Figure 5:
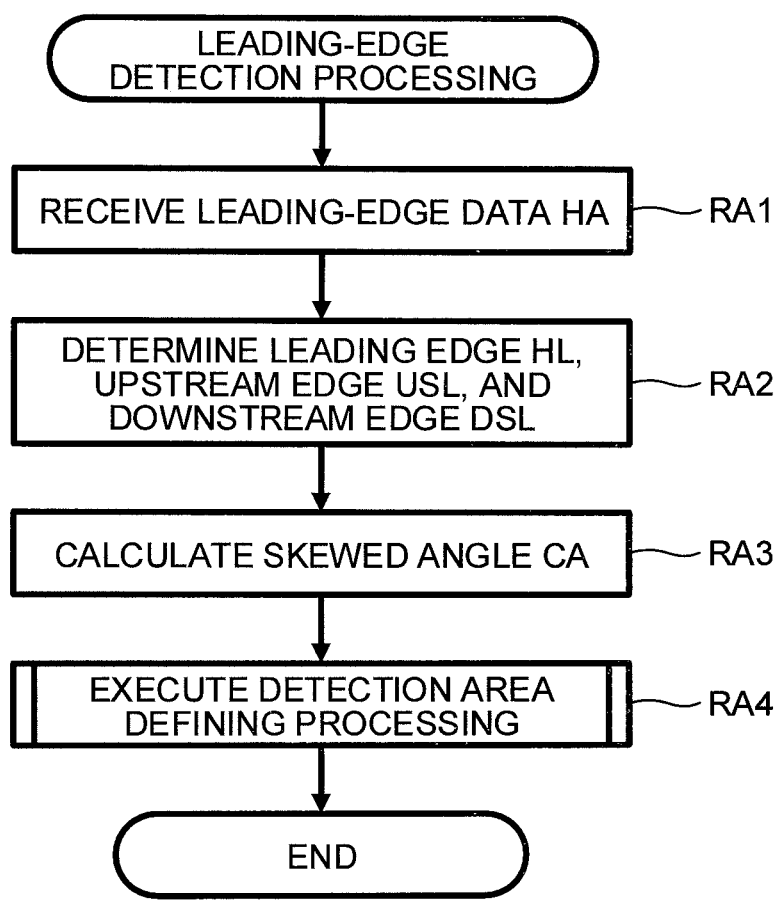
FIG. 5 is a flowchart of leading-edge detection processing in the illustrative embodiment according to one or more aspects of the disclosure.

As illustrated in FIG. 5, in response to start of the leading-edge detection processing (e.g., step R3), in step RA1, the CPU 30 acquires leading-edge data HA (refer to FIGS. 25, 26A and 27A). More specifically, for example, the CPU 30 acquires, as leading-edge data HA, a plurality of pieces of black and white data WBD included from the first line FL (refer to FIG. 25) to the leading-edge data end position HADP in the sub-scanning direction SD, among all the pieces of the black and white data WBD stored in the RAM 32. The first line FL correspond to the most-upstream line with respect to the sub-scanning direction SD. The leading-edge data end position HADP correspond to the 350th line downstream from the first line FL with respect to the sub-scanning direction SD. That is, the leading-edge data HA may correspond to a plurality of pieces of black and while data WBD included in the range from the first line FL to the leading-edge data end position HADP (e.g., the 350th line) with respect to the sub-scanning direction SD.

In step RA2, the CPU 30 determines a leading edge HL, an upstream edge USL, and a downstream edge DSL. More specifically, for example, as illustrated in FIGS. 25, 26A, and 27A, the CPU 30 determines a leading edge HL, an upstream edge USL, and a downstream edge DSL of a document GS based on the acquired leading-edge data HA. The leading edge HL may be a straight line extending with respect to the main scanning direction MD. The upstream edge USL may be a straight line as an upstream edge of the document GS with respect to the main scanning direction MD and extend with respect to the sub-scanning direction SD. The downstream edge DSL may be a straight line as a downstream edge of the document GS with respect to the main scanning direction MD and extend with respect to the sub-scanning direction SD.

In step RA3, the CPU 30 calculates a skewed angle CA of the leading edge HL (refer to FIGS. 26A and 27A). More specifically, for example, the CPU 30 calculates the degree of inclination of the leading edge HL relative to a straight line MD1 extending parallel to the main scanning direction MD. In a case where the leading edge HL extends downstream in the sub-scanning direction SD as the leading edge HL extends downstream in the main scanning direction MD, the CPU 30 determines "clockwise skew" as the skewed angle CA. In a case where the leading edge HL extends upstream in the sub-scanning direction SD as the leading edge HL extends downstream in the main scanning direction MD, the CPU 30 determines "counterclockwise skew" as the skewed angle CA. In a case where the leading edge HL extends parallel to the straight line MD1, the CPU 30 determines "no skew" as the skewed angle CA. The skewed angle CA may indicate a skewing direction and an inclination angle (e.g., degree) of a leading edge HL relative to the straight line MD1. The skewing direction includes, for example, "clockwise skew", "counterclockwise skew", and "no skew". Sine processing or tangent processing may be applied to the calculated inclination angle of the leading edge HL relative to the straight line MD1.

In step RA4, the CPU 30 executes detection area defining processing. More specifically, for example, the CPU 30 executes one of detection area defining processing for non-skewed document, detection area defining processing for counterclockwise skewed document, and detection area defining processing for clockwise skewed document, to calculate a downstream reference point position DCP and an upstream reference point position UCP and define a detection area DR1, a detection area DR2, a detection area DR3, and a specified position SP. In response to the end of step RA4, the leading-edge detection processing (e.g., step R3) ends.

Detection Area Defining Processing

Figure 6:
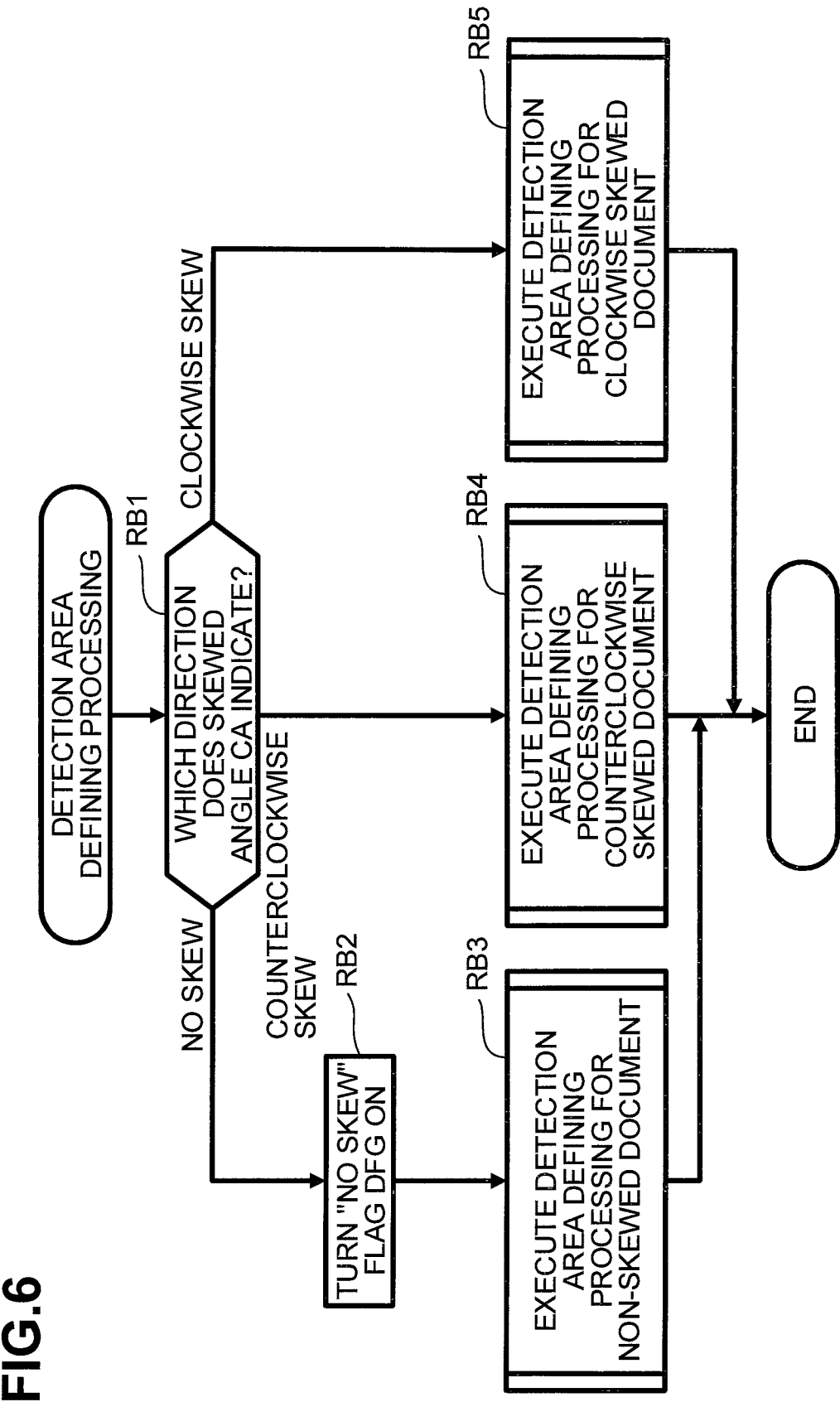
FIG. 6 is a flowchart of detection area defining processing in the illustrative embodiment according to one or more aspects of the disclosure.

As illustrated in FIG. 6, in response to start of the detection area defining processing (e.g., step RA4), in step RB1, the CPU 30 determines which skewing direction does the skewed angle CA indicate. If the CPU 30 determines that the skewed angle CA indicates "no skew" (e.g., NO SKEW in step RB1), the routine proceeds to step RB2. If the CPU 30 determines that the skewed angle CA indicates "counterclockwise skew" (e.g., COUNTERCLOCKWISE SKEW in step RB1), the routine proceeds to step RB4. If the CPU 30 determines that the skewed angle CA indicates "clock-wise skew" (e.g., CLOCKWISE SKEW in step RB1), the routine proceeds to step RB5.

If, in step RB1, the CPU 30 determines the skewed angle CA indicates "no skew", in step RB2, the CPU 30 turns the "no skew" flag DFG on and stores this flag information in the RAM 32.

In step RB3, the CPU 30 executes the detection area defining processing for non-skewed document. More specifically, for example, as illustrated in FIG. 25, the CPU 30 calculates a downstream reference point position DCP and an upstream reference point position UCP and defines a detection area DR1, a detection area DR2, and a detection area DR3. In response to the end of step RB3, the detection area defining processing (e.g., step RA4) ends.

If, in step RB1, the CPU 30 determines that the skewed angle CA indicates "counterclockwise skew", in step RB4, the CPU 30 executes the detection area defining processing for counterclockwise skewed document. More specifically, for example, as illustrated in FIG. 27A, the CPU 30 calculates a downstream reference point position DCP and an upstream reference point position UCP and defines a detection area DR1, a detection area DR2, a detection area DR3, and a specified position SP. In response to the end of step RB4, the detection area defining processing (e.g., step RA4) ends.

If, in step RB1, the CPU 30 determines that the skewed angle CA indicates "clockwise skew", in step RB5, the CPU 30 executes the detection area defining processing for clockwise skewed document. More specifically, for example, as illustrated in FIG. 26A, the CPU 30 calculates a downstream reference point position DCP and an upstream reference point position UCP and defines a detection area DR1, a detection area DR2, a detection area DR3, and a specified position SP. In response to the end of step RB5, the detection area defining processing (e.g., step RA4) ends.

Detection Area Defining Processing for Non-Skewed Document

Figure 7:
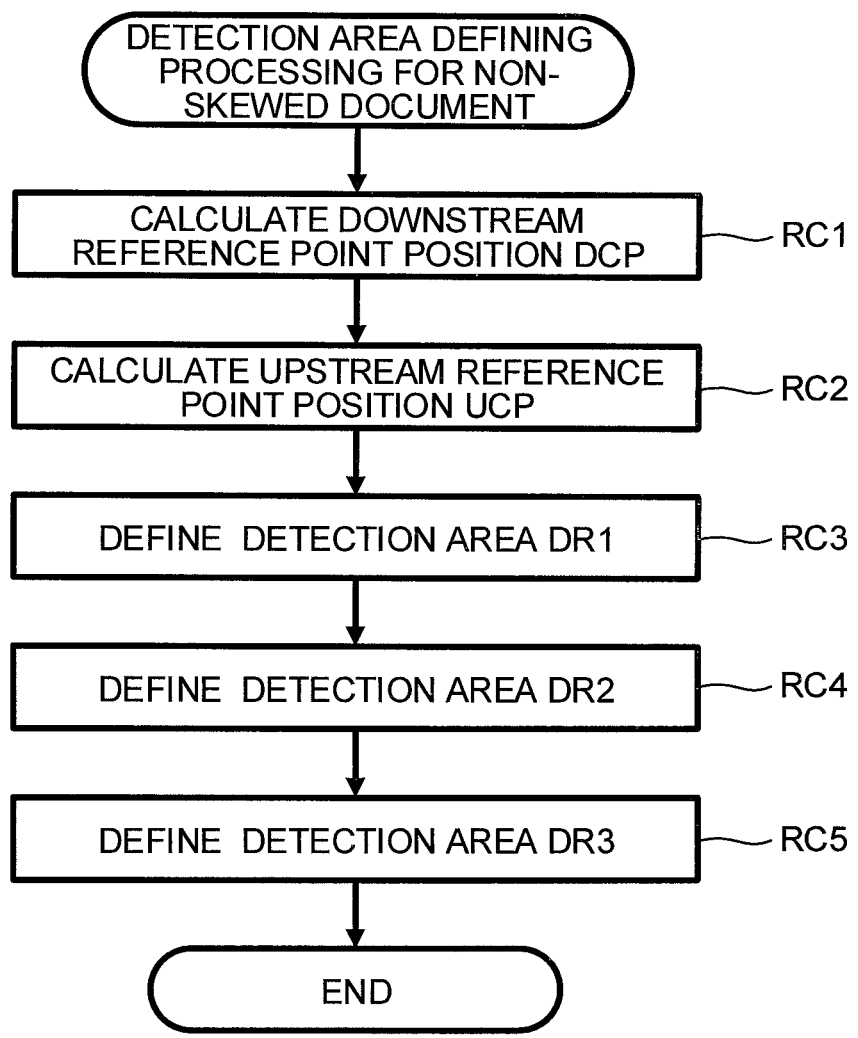
FIG. 7 is a flowchart of detection area defining processing for non-skewed document in the illustrative embodiment according to one or more aspects of the disclosure.

As illustrated in FIG. 7, in response to start of the detection area defining processing for non-skewed document (e.g., step RB3), in step RC1, the CPU 30 calculates a downstream reference point position DCP (refer to FIG. 25). More specifically, for example, the CPU 30 calculates, as the downstream reference point position DCP, a location of a certain pixel on the leading-edge data end position HADP with respect to the main scanning direction MD. The certain pixel may be located on the downstream edge DSL with respect to the sub-scanning direction SD.

In step RC2, the CPU 30 calculates an upstream reference point position UCP (refer to FIG. 25). More specifically, for example, the CPU 30 calculates, as the upstream reference point position UCP, a location of another certain pixel on the leading-edge data end position HADP with respect to the main scanning direction MD. The certain pixel may be located on the upstream edge USL with respect to the sub-scanning direction SD.

In step RC3, the CPU 30 defines a detection area DR1 (refer to FIG. 25). More specifically, for example, the CPU 30 defines, as the detection area DR1, an area that has a length extending downstream from the leading-edge data end position HADP in the sub-scanning direction SD and a width of 31 pixels extending downstream from the upstream reference point position UCP in the main scanning direction MD. The CPU 30 stores this information in the RAM 32.

In step RC4, the CPU 30 defines a detection area DR2 (refer to FIG. 25). More specifically, for example, the CPU 30 defines, as the detection area DR2, an area that has a length extending downstream from the leading-edge data end position HADP in the sub-scanning direction SD and has a width of 31 pixels in the main scanning direction MD relative to a midpoint MP between the upstream reference point position UCP and the downstream reference point position DCP with respect to the main scanning direction MD. The CPU 30 stores this information in the RAM 32.

In step RC5, the CPU 30 defines a detection area DR3 (refer to FIG. 25). More specifically, for example, the CPU 30 defines, as a detection area DR3, an area that has a length extending downstream from the leading-edge data end position HADP in the sub-scanning direction SD and a width of 31 pixels extending upstream from the downstream reference point position DCP in the main scanning direction MD. The CPU 30 stores this information in the RAM 32. In response to the end of step RC5, the detection area defining processing for non-skewed document (e.g., step RB3) ends.

Detection Area Defining Processing for Counterclockwise Skewed Document

Figure 8:
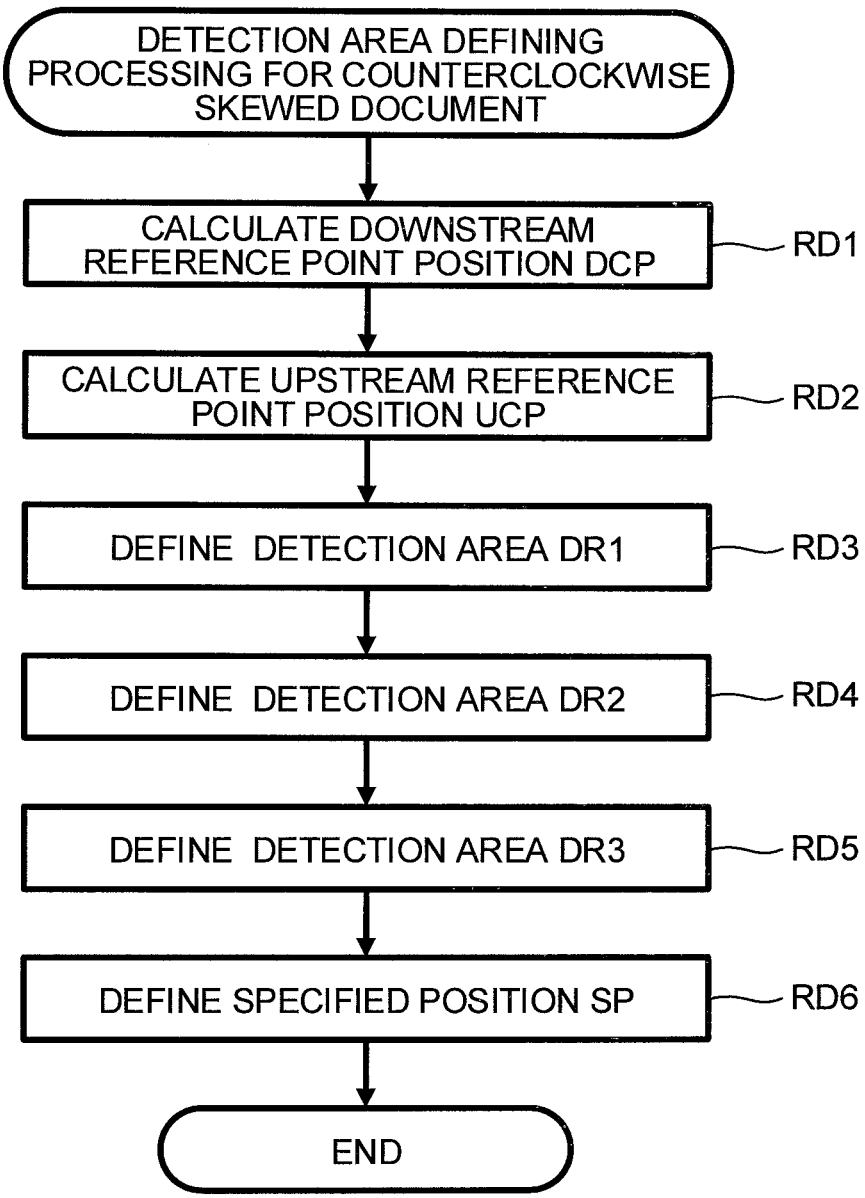
FIG. 8 is a flowchart of detection area defining processing for counterclockwise skewed document in the illustrative embodiment according to one or more aspects of the disclosure.

As illustrated in FIG. 8, in response to start of the detection area defining processing for counterclockwise skewed document (e.g., step RB4), in step RD1, the CPU 30 calculates a downstream reference point position DCP (refer to FIG. 27A). More specifically, for example, the CPU 30 calculates, as the downstream reference point position DCP, a location of a certain pixel on the leading-edge data end position HADP with respect to the main scanning direction MD. The certain pixel may be located on the downstream edge DSL with respect to the sub-scanning direction SD.

In step RD2, the CPU 30 calculates an upstream reference point position UCP (refer to FIG. 27A). More specifically, for example, the CPU 30 calculates, as an upstream reference point position UCP, a location of another certain pixel that is on the upstream edge USL and is away from the leading edge HL by a distance obtained by multiplying a distance between the upstream edge USL and the downstream edge DSL by the square root of "2". More specifically, for example, as illustrated in FIG. 27A, the CPU 30 determines a standard-sized document SGS with respect to the document GS. The standard-sized document SGS may have a width (e.g., a dimension in a shorter side) that may be a distance between an upstream edge USL and a downstream edge DSL and a length (e.g., a dimension in a longer side) that may be obtained by multiplying the width by the square root of "2". In the illustrative embodiment, the square root of "2" may be equal to a value obtained by dividing a dimension of a longer side of a standard-sized document SGS by a dimension of a shorter side of the standard-sized document. For example, the standard-size document SGS may be an A4-sized document having a width of 210 mm in its shorter sides and a length of 297 mm in its longer sides. Based on the standard-sized document SGS, the CPU 30 calculates, as the downstream reference point position DCP, a location of a pixel that is on the upstream edge USL and is away from the leading edge HL by a distance obtained by multiplying a distance between the upstream edge USL and the downstream edge DSL by the square root of "2".

In step RD3, the CPU 30 defines a detection area DR1 (refer to FIG. 27A). More specifically, for example, the CPU 30 defines, as the detection area DR1, an area that has a length extending downstream from the leading-edge data end position HADP in the sub-scanning direction SD and a width of 31 pixels extending upstream from the downstream reference point position DCP in the main scanning direction MD.

In step RD4, the CPU 30 defines a detection area DR2 (refer to FIG. 27A). More specifically, for example, the CPU 30 defines, as the detection area DR2, an area that has a length extending downstream from the leading-edge data end position HADP in the sub-scanning direction SD and has a width of 31 pixels in the main scanning direction MD relative to a midpoint MP between the upstream reference point position UCP and the downstream reference point position DCP with respect to the main scanning direction MD. The CPU 30 stores this information in the RAM 32.

In step RD5, the CPU 30 defines a detection area DR3 (refer to FIG. 27A). More specifically, for example, the CPU 30 defines, as the detection area DR3, an area that has a length extending downstream from the leading-edge data end position HADP in the sub-scanning direction SD and a width of 31 pixels extending downstream from the upstream reference point position UCP in the main scanning direction MD. The CPU 30 stores this information in the RAM 32.

In step RD6, the CPU 30 defines a specified position SP (refer to FIG. 27A). More specifically, for example, the CPU 30 defines, as the specified position SP, the upstream reference point position UCP calculated in step RD2, and stores this information in the RAM 32. In response to the end of step RD6, the detection area defining processing for counterclockwise skewed document (e.g., step RB4) ends.

Detection Area Defining Processing for Clockwise Skewed Document

Figure 9:
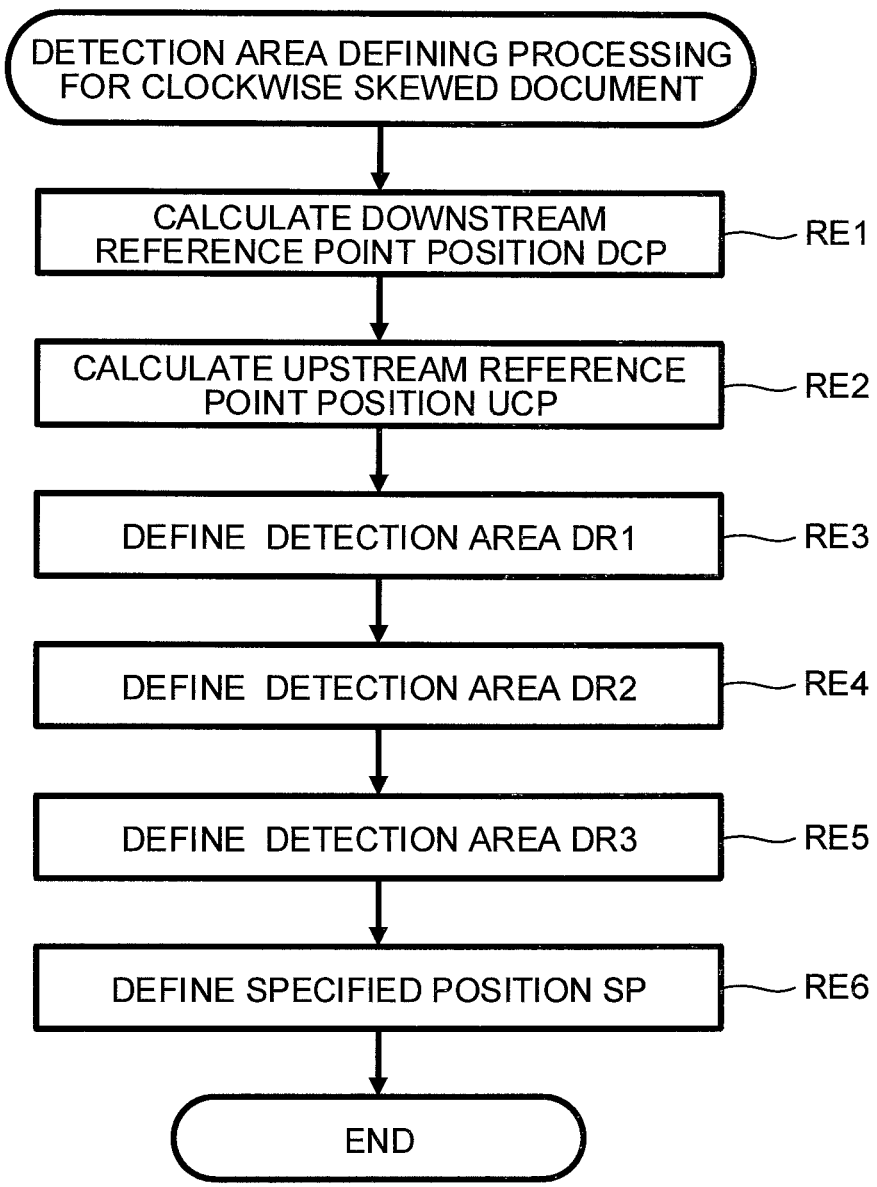
FIG. 9 is a flowchart of detection area defining processing for clockwise skewed document in the illustrative embodiment according to one or more aspects of the disclosure.

As illustrated in FIG. 9, in response to start of the detection area defining processing for clockwise skewed document (e.g., step RB5), in step RE1, the CPU 30 calculates a downstream reference point position DCP (refer to FIG. 26A). More specifically, for example, the CPU 30 calculates, as the downstream reference point position DCP, a location of a certain pixel that is on the downstream edge DSL and is away from the leading edge HL by a distance obtained by multiplying a distance between the upstream edge USL and the downstream edge DSL by the square root of "2". In the illustrative embodiment, the square root of "2" may be equal to a value obtained by dividing the dimension of the longer side of the standard-sized document SGS by the dimension of the shorter side of the standard-sized document SGS.

In step RE2, the CPU 30 calculates an upstream reference point position UCP (refer to FIG. 26A). More specifically, for example, the CPU 30 calculates, as the upstream reference point position UCP, a location of another certain pixel on the leading-edge data end position HADP with respect to the main scanning direction MD. The certain pixel may be located on the upstream edge USL with respect to the sub-scanning direction SD.

In step RE3, the CPU 30 defines a detection area DR1 (refer to FIG. 26A). More specifically, for example, the CPU 30 defines, as the detection area DR1, an area that has a length extending downstream from the leading-edge data end position HADP in the sub-scanning direction SD and a width of 31 pixels extending downstream from the upstream reference point position UCP in the main scanning direction MD.

In step RE4, the CPU 30 defines a detection area DR2 (refer to FIG. 26A). More specifically, for example, the CPU 30 defines, as the detection area DR2, an area that has a length extending downstream from the leading-edge data end position HADP in the sub-scanning direction SD and has a width of 31 pixels in the main scanning direction MD relative to a midpoint MP between the upstream reference point position UCP and the downstream reference point position DCP with respect to the main scanning direction MD. The CPU 30 stores this information in the RAM 32.

In step RE5, the CPU 30 defines a detection area DR3 (refer to FIG. 26A). More specifically, for example, the CPU 30 defines, as the detection area DR3, an area that has a length extending downstream from the leading-edge data end position HADP in the sub-scanning direction SD and a width of 31 pixels extending upstream from the downstream reference point position DCP in the main scanning direction MD. The CPU 30 stores this information in the RAM 32.

In step RE6, the CPU 30 defines a specified position SP (refer to FIG. 26A). More specifically, for example, the CPU 30 defines, as the specified position SP, the downstream reference point position DCP calculated in step RD2, and stores this information in the RAM 32. In response to the end of step RE6, the detection area defining processing for clockwise skewed document (e.g., step RB5) ends.

Document Detection Processing

Figure 10:
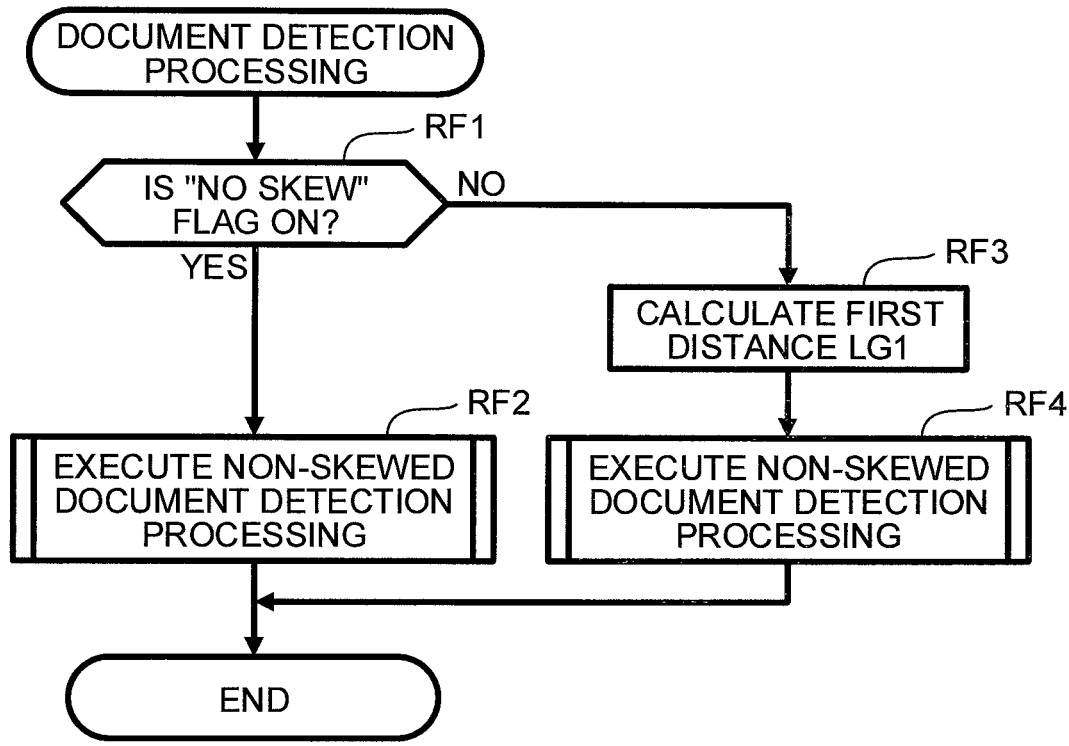
FIG. 10 is a flowchart of document detection processing in the illustrative embodiment according to one or more aspects of the disclosure.

As illustrated in FIG. 10, in response to start of the document detection processing (e.g., step R4), the CPU 30 determines whether the "no skew" flag DFG is on (e.g., step RF1). If the CPU 30 determines that the "no skew" flag is on (e.g., YES in step RF1), the routine proceeds to step RF2. If the CPU 30 determines that the "no skew" flag is off (e.g., NO in step RF1), the routine proceeds to step RF3.

If, in step RF1, the CPU 30 determines that the "no skew" flag is on, in step RF2, the CPU 30 executes the non-skewed document detection processing. More specifically, for example, the CPU 30 calculates a first edge count EN1, a second edge count EN2, and a third edge count EN3. If the document edge flag EFG is on and all of the first edge count EN1, the second edge count EN2, and the third edge count EN3 have a value smaller than a threshold TH, the CPU 30 ends the non-skewed document detection processing (e.g., step RF2). In response to the end of step RF2, the document detection processing (e.g., step R4) ends. In the illustrative embodiment, in response to the image scanner SM reading a background color of a document GS, the edge detector 39 may generate black and white data WBD having value "1" at the rate of 5%. In response to the image scanner SM reading a surface color of the document cover CV, the edge detector 39 may generate black and white data WBD having value "0" at the rate of less than 1%. Therefore, in a case where the reader 20 reads a background color of a document GS in any detection area having the width of 31 pixels, the edge detector 39 may generate black and white data WBD having value "1" for one or two pixels. In a case where the reader 20 reads a surface color of the document cover CV in any detection area having the width of 31 pixels, the edge detector 39 may generate black and white data WBD having value "0" for none or one pixel. In a case where the reader 20 reads an edge of a document GS, the edge detector 39 may generate black and white data WBD having value "1". Therefore, in the illustrative embodiment, the threshold TH may be 2 that is greater than 1 (one).

If, in step RF1, the CPU 30 determines that the "no skew" flag is off, in step RF3, the CPU 30 calculates a first distance LG1 (refer to FIG. 26A or 27A). More specifically, the CPU 30 calculates the first distance LG1 by multiplying a value obtained by application of the tangent processing to the skewed angle CA by a distance between a midpoint of the detection area DR1 in the main scanning direction MD and a midpoint of the detection area DR2 in the main scanning direction MD.

In step RF4, the CPU 30 executes the skewed document detection processing. The CPU 30 executes first detection processing to turn a first flag FG1 on based on the first edge count EN1 and stores a first detection position DP1. The CPU 30 executes second detection processing to turn a second flag FG2 on based on the second edge count EN2 and store a second detection position DP2. The CPU 30 turns a rectangle flag RTFG on or off based on the first detection position DP1 and stores the second detection position DP2. The CPU 30 executes third detection processing or fourth detection processing to calculate a moving distance HTL (e.g., a distance that the reader 20 needs to move to stop at a stop position HTP) based on the rectangle flag RTFG. If the CPU 30 determines that the rectangle flag RTFG is on, the CPU 30 continues the ongoing reading operation until the reader 20 reaches the stop position HTP. In response to the end of step RF4, the document detection processing (e.g., step R4) ends.

Non-Skewed Document Detection Processing

Figure 11:
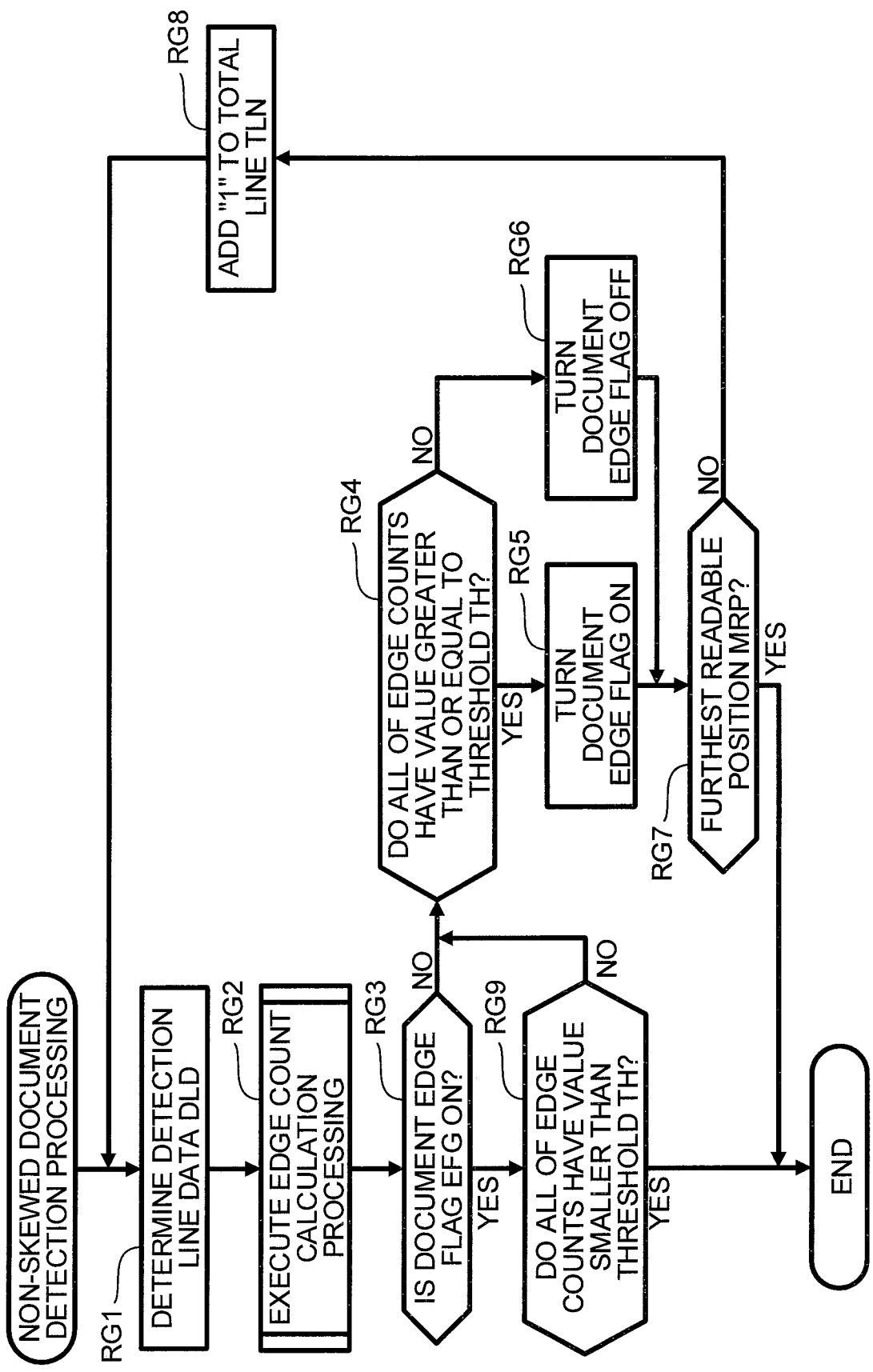
FIG. 11 is a flowchart of non-skewed document detection processing in the illustrative embodiment according to one or more aspects of the disclosure.

As illustrated in FIG. 11, in response to start of the non-skewed document detection processing (e.g., step RF2), the CPU 30 determines detection line data DLD (e.g., step RG1). More specifically, for example, the CPU 30 determines, as the detection line data DLD, black and white data WBD included in a single target line that may be an n-th line in the sub-scanning direction SD ("n" may correspond to the current value of the total line TLN), and stores this information in the RAM 32. The location of the target line in the sub-scanning direction SD corresponding to the current value of the total line TLN may indicate a location of a single line in the sub-scanning direction SD located away from the first line FL by the current value of the total line TLN in the sub-scanning direction SD. In the illustrative embodiment, the CPU 30 may set the value "350" to the total line TLN in step R1 and then add 1 (one) to the total line TLN in step RG8. The CPU 30 may execute step RG8 one or more times. Thus, the CPU 30 determines, as the detection line data DLD, black and white data WBD included in any single line located downstream from the leading-edge data end position HADP in the sub-scanning direction SD. The total line TLN set in step RG1 may indicate the total number of lines from the first line FL to a target line to which processing of step RF2 (e.g., non-skewed document detection processing) is to be applied.

Figure 12:
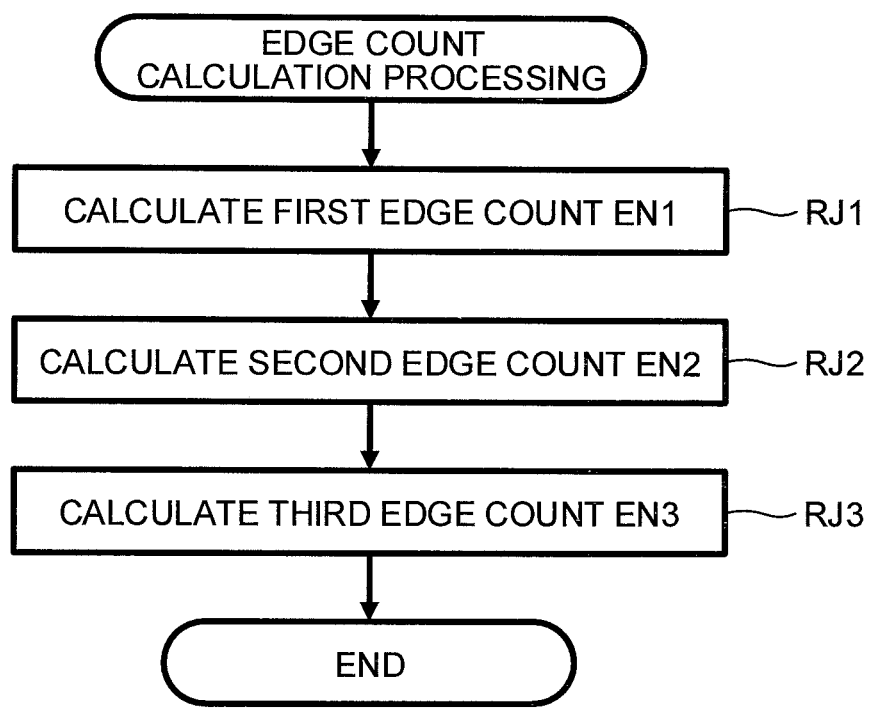
FIG. 12 is a flowchart of edge count calculation processing in the illustrative embodiment according to one or more aspects of the disclosure.

In step RG2, the CPU 30 executes edge count calculation processing (refer to FIG. 12). As illustrated in FIG. 12, in response to start of the edge count calculation processing (e.g., step RG2), in step RJ1, the CPU 30 calculates a first edge count EN1. More specifically, for example, the CPU 30 counts pixels represented by the black and white data WBD having value "1" in the detection area DR1 in the detection line data DLD, and determines the number of pixels as the first edge count EN1.

In step RJ2, the CPU 30 calculates a second edge count EN2. More specifically, for example, the CPU 30 counts pixels represented by the black and white data WBD having value "1" in the detection area DR2 in the detection line data DLD, and determines the number of pixels as the second edge count EN2.

In step RJ3, the CPU 30 calculates a third edge count EN3. More specifically, for example, the CPU 30 counts pixels represented by the black and white data WBD having value "1" in the detection area DR3 in the detection line data DLD, and determines the number of pixels as the third edge count EN3. In response to the end of step RJ3, the edge count calculation processing (e.g., step RG2) ends.

As illustrated in FIG. 11, in response to the end of step RG2, in step RG3, the CPU 30 determines whether the document edge flag EFG is on. If the CPU 30 determines that the document edge flag EFG is on (e.g., YES in step RG3), the routine proceeds to step RG9. If the CPU 30 determines that the document edge flag EFG is off (e.g., NO in step RG3), the routine proceeds to step RG4.

If, in step RG3 or RG9, the CPU 30 makes a negative determination (e.g., NO), in step RG4, the CPU 30 determines whether all of the first edge count EN1, the second edge count EN2, and the third edge count EN3 have a value greater than or equal to the threshold TH. If the CPU 30 determines that all of the first edge count EN1, the second edge count EN2, and the third edge count EN3 have a value greater than or equal to the threshold TH (e.g., YES in step RG4), the routine proceeds to step RG5. If the CPU 30 determines that at least one of the first edge count EN1, the second edge count EN2, and the third edge count EN3 has a value smaller than the threshold TH (e.g., NO in step RG4), the routine proceeds to step RG6. In the illustrative embodiment, the threshold TH may be 2.

If, in step RG4, the CPU 30 makes a positive determination (e.g., YES), in step RG5, the CPU 30 turns the document edge flag EFG on and stores this flag information in the RAM 32. In response to the end of step RG5, the routine proceeds to step RG7.

If, in step RG4, the CPU 30 makes a negative determination (e.g., NO), in step RG6, the CPU 30 turns the document edge flag EFG off and stores this flag information in the RAM 32.

In response to the end of step RG5 or RG6, in step RG7, the CPU 30 determines whether the location of the target line in the sub-scanning direction SD corresponding to the current value of the total line TLN indicates the furthest readable position MRP (refer to FIG. 11). If the CPU 30 determines that the location of the target line in the sub-scanning direction SD corresponding to the current value of the total line TLN indicates the furthest readable position MRP (e.g., YES in step RG7), the non-skewed document detection processing (e.g., step RF2) ends. If the CPU 30 determines that the location of the target line in the sub-scanning direction SD corresponding to the current value of the total line TLN does not indicate the furthest readable position MRP (e.g., NO in step RG7), the routine proceeds to step RG8. In the illustrative embodiment, the location of the target line in the sub-scanning direction SD corresponding to the current value of the total line TLN may indicate a location of a single line in the sub-scanning direction SD located away from the first line FL by the current value of the total line TLN in the sub-scanning direction SD.

In step RG8, the CPU 30 adds 1 (one) to the line total TLN. In response to the end of step RG8, the routine proceeds to step RG1.

If, in step RG3, the CPU 30 makes a positive determination ("YES"), in step RG9, the CPU 30 determines whether all of the first edge count EN1, the second edge count EN2, and the third edge count EN3 have a value smaller than the threshold TH. If the CPU 30 determines that at least one of the first edge count EN1, the second edge count EN2, and the third edge count EN3 has a value greater than or equal to the threshold TH (e.g., NO in step RG9), the routine proceeds to step RG4. If the CPU 30 determines that all of the first edge count EN1, the second edge count EN2, and the third edge count EN3 have a value smaller than the threshold TH (e.g., YES in step RG9), the non-skewed document detection processing (e.g., step RF2) ends. That is, the document GS does not extend any further in the sub-scanning direction SD and the current detection line data DLD represents the document cover CV. In the illustrative embodiment, the threshold TH may be 2.

Skewed Document Detection Processing

Figure 13:
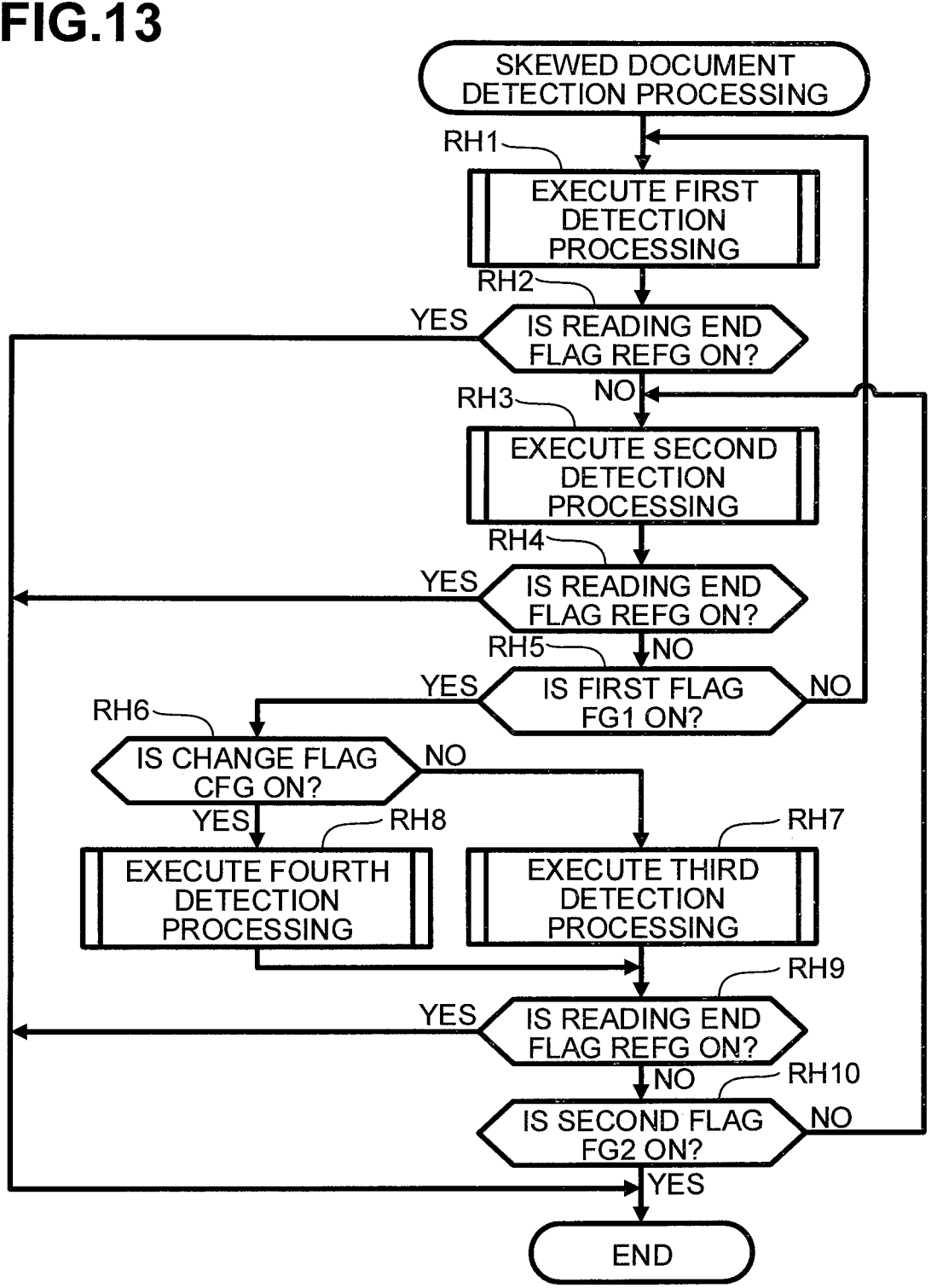
FIG. 13 is a flowchart of skewed document detection processing in the illustrative embodiment according to one or more aspects of the disclosure.

As illustrated in FIG. 13, in response to start of the skewed document detection processing (e.g., step RF4), in step RH1, the CPU 30 executes the first detection processing. In the first detection processing, in one case, the CPU 30 turns the first flag FG1 on and stores a first detection position DP1. In another case, the CPU 30 turns the reading end flag REFG on. In a case where the location of the target line in the sub-scanning direction SD corresponding to the current value of the total line TLN indicates the specified position SP, the CPU 30 defines a detection area DR4 and turns a change flag CFG on.

In step RH2, the CPU 30 determines whether the reading end flag REFG is on. If the CPU 30 determines that the reading end flag REFG is on (e.g., YES in step RH2), the skewed document detection processing (e.g., step RF4) ends. If the CPU 30 determines that the reading end flag REFG is off (e.g., NO in step RH2), the routine proceeds to step RH3.

In step RH3, the CPU 30 executes the second detection processing. In the second detection processing, in one case, the CPU 30 turns the second flag FG2 on and sets a rectangle flag RTFG. In another case, the CPU 30 turns the reading end flag REFG on. In still another case, the CPU 30 turns the first flag FG1 off. In a case where the location of the target line in the sub-scanning direction SD corresponding to the current value of the total line TLN indicates the specified position SP, the CPU 30 defines a detection area DR4 and turns a change flag CFG on.

In step RH4, the CPU 30 determines whether the reading end flag REFG is on. If the CPU 30 determines that the reading end flag REFG is on (e.g., YES in step RH4), the skewed document detection processing (e.g., step RF4) ends. If the CPU 30 determines that the reading end flag REFG is off (e.g., NO in step RH4), the routine proceeds to step RH5.

In step RH5, the CPU 30 determines whether the first flag FG1 is on. If the CPU 30 determines that the first flag FG1 is off (e.g., NO in step RH5), the routine proceeds to step RH1. If the CPU 30 determines that the first flag FG1 is on (e.g., YES in step RH5), the routine proceeds to step RH6.

In step RH6, the CPU 30 determines whether the change flag CFG is on. If the CPU 30 determines that the change flag CFG is on (e.g., YES in step RH6), the routine proceeds to step RH8. If the CPU 30 determines that the change flag CFG is off (e.g., NO in step RH6), the routine proceeds to step RH7.

In step RH7, the CPU 30 executes the third detection processing. In the third detection processing, in one case, the CPU 30 turns the reading end flag REFG on. In another case, the CPU 30 turns the second flag FG2 off. In still another case, if the rectangle flag RTFG is on, the CPU 30 continues the ongoing reading operation until the reader 20 reaches the stop position HTP. In response to the end of step RH7, the routine proceeds to step RH9.

If, in step RH6, the CPU 30 makes a positive determination (e.g., YES), in step RH8, the CPU 30 executes the fourth detection processing. In the fourth detection processing, in one case, the CPU 30 turns the reading end flag REFG on. In another case, the CPU 30 turns the second flag FG2 off. In still another case, if the rectangle flag RTFG is on, the CPU 30 continues the ongoing reading operation until the reader 20 reaches the stop position HTP.

In response to the end of step RH7 or RH8, in step RH9, the CPU 30 determines whether the reading end flag REFG is on. If the CPU 30 determines that the reading end flag REFG is on (e.g., YES in step RH9), the skewed document detection processing (e.g., step RF4) ends. If the CPU 30 determines that the reading end flag REFG is off (e.g., NO in step RH9), the routine proceeds to step RH10.

In step RH10, the CPU 30 determines whether the second flag FG2 is on. If the CPU 30 determines that the second flag FG2 is off (e.g., NO in step RH10), the routine proceeds to step RH3. If the CPU 30 determines that the second flag FG2 is on (e.g., YES in step RH10), the skewed document detection processing (e.g., step RF4) ends. That is, the document GS does not extend any further in the sub-scanning direction SD and the current detection line data DLD represents the document cover CV.

First Detection Processing

Figure 14:
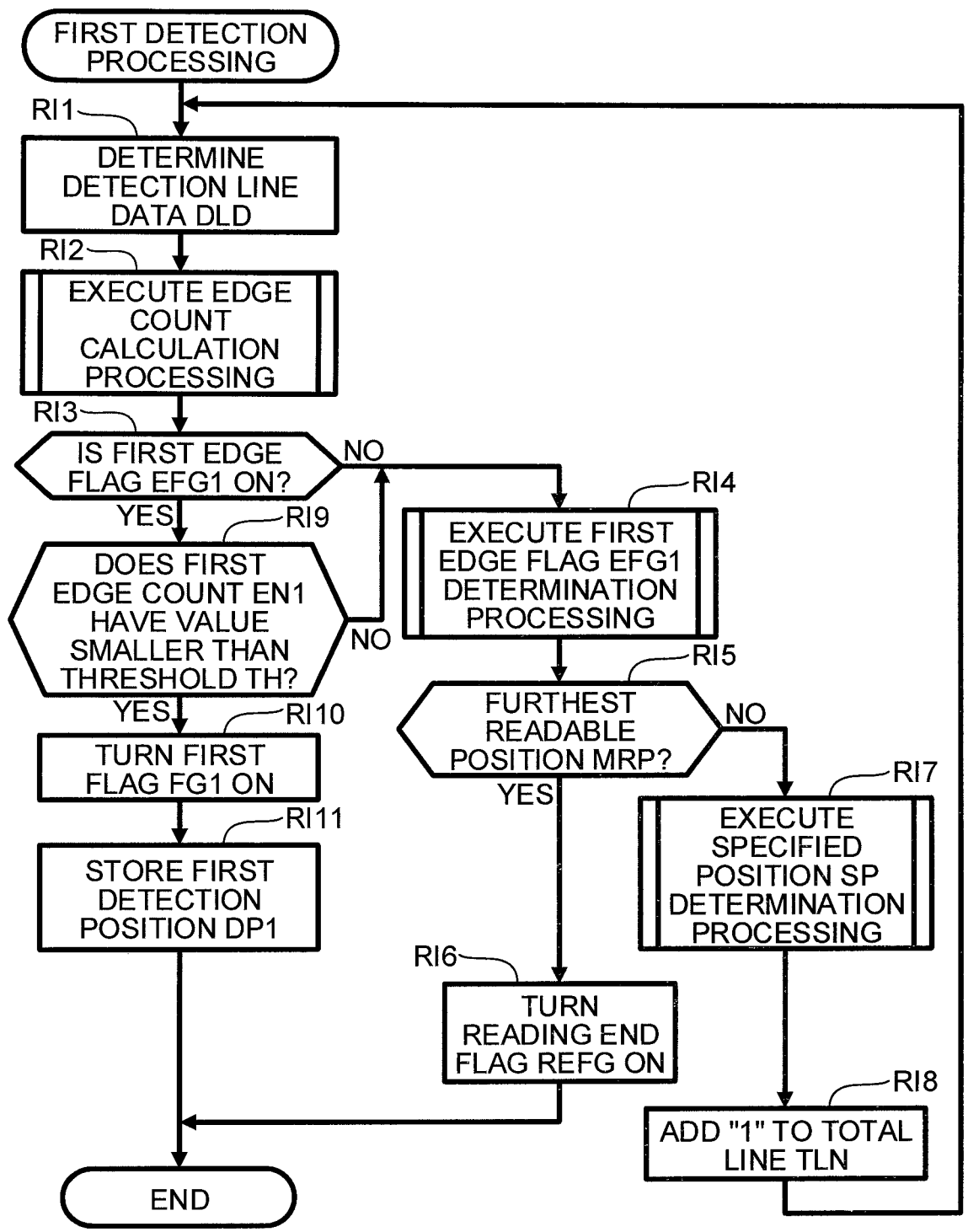
FIG. 14 is a flowchart of first detection processing in the illustrative embodiment according to one or more aspects of the disclosure.

As illustrated in FIG. 14, in response to start of the first detection processing (e.g., step RH1), in step RI1, the CPU 30 determines detection line data DLD. More specifically, for example, the CPU 30 determines, as the detection line data DLD, black and white data WBD included in a single target line that may be an n-th line in the sub-scanning direction SD ("n" may correspond to the current value of the total line TLN), and stores this information in the RAM 32. The location of the target line in the sub-scanning direction SD corresponding to the current value of the total line TLN may indicate a location of a single line in the sub-scanning direction SD located away from the first line FL by the current value of the total line TLN in the sub-scanning direction SD. In the illustrative embodiment, the CPU 30 may set the value "350" to the total line TLN in step R1 and then add 1 (one) to the total line TLN in step RI8. The CPU 30 may execute step RI8 one or more times. Thus, the CPU 30 determines, as the detection line data DLD, black and white data WBD included in any single line located downstream from the leading-edge data end position HADP in the sub-scanning direction SD. The value of the total line TLN determined in step RI1 may indicate the value corresponding to the n-th line from the first line FL, in which the n-th line may be a target line to which the first detection processing (e.g., step RH1) is to be applied.

In step RI2, the CPU 30 executes the edge count calculation processing. More specifically, for example, as illustrated in FIG. 12, the CPU 30 calculates a first edge count EN1, a second edge count EN2, and a third edge count EN3 in a similar manner to the edge count calculation processing in step RG2.

In step RI3, the CPU 30 determines whether the first edge flag EFG1 is on. If the CPU 30 determines that the first edge flag EFG1 is on (e.g., YES in step RI3), the routine proceeds to step RI9. If the CPU 30 determines that the first edge flag EFG1 is off (e.g., NO in step RI3), the routine proceeds to step RI4.

Figure 15:
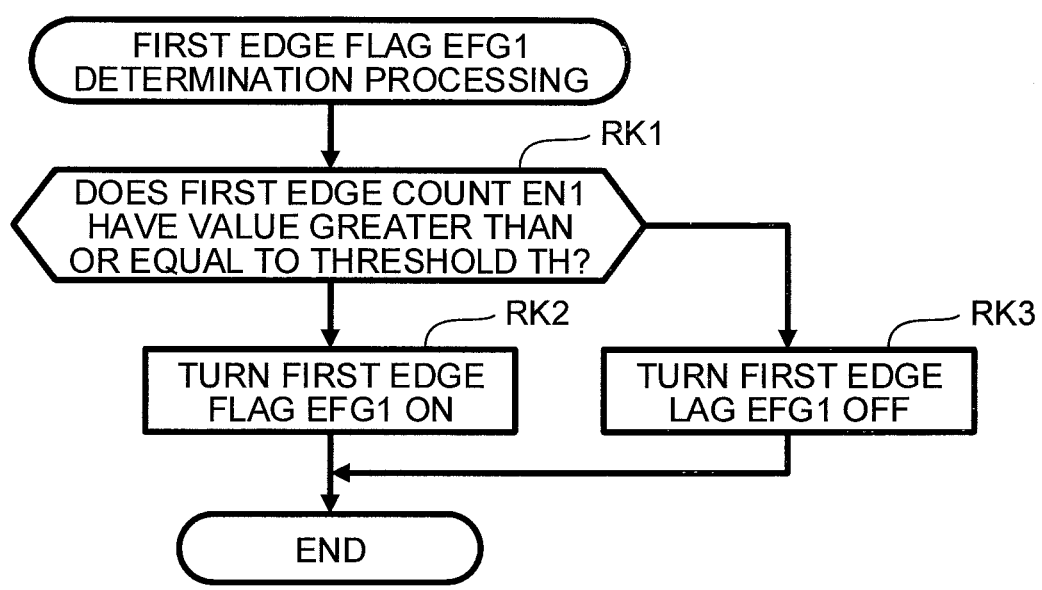
FIG. 15 is a flowchart of first edge flag determination processing in the illustrative embodiment according to one or more aspects of the disclosure.

If, in step RI3, the CPU 30 makes a negative determination (e.g., NO), in step RI4, the CPU 30 executes first edge flag EFG1 determination processing (refer to FIG. 15). As illustrated in FIG. 15, in response to start of the first edge flag EFG1 determination processing (e.g., step RI4), in step RK1, the CPU 30 determines whether the first edge count EN1 has a value greater than or equal to the threshold TH. If the CPU 30 determines that the first edge count EN1 has a value greater than or equal to the threshold TH (e.g., YES in step RK1), the routine proceeds to step RK2. If the CPU 30 determines that the first edge count EN1 has a value smaller than the threshold TH (e.g., NO in step RK1), the routine proceeds to step RK3. In the illustrative embodiment, the threshold TH may be 2.

If, in step RK1, the CPU 30 makes a positive determination (e.g., YES), in step RK2, the CPU 30 turns the first edge flag EFG1 on and stores this flag information in the RAM 32. In response to the end of step RK2, the first edge flag EFG1 determination processing (e.g., step RI4) ends.

If, in step RK1, the CPU 30 makes a negative determination (e.g., NO), in step RK3, the CPU 30 turns the first edge flag EFG1 off and stores this flag information in the RAM 32. In response to the end of step RK3, the first edge flag EFG1 determination processing (e.g., step RI4) ends.

As illustrated in FIG. 14, in response to the end of step RI4, in step RI5, the CPU 30 determines whether the location of the target line in the sub-scanning direction SD corresponding to the current value of the total line TLN indicates the furthest readable position MRP. If the CPU 30 determines that the location of the target line in the sub-scanning direction SD corresponding to the current value of the total line TLN indicates the furthest readable position MRP (e.g., YES in step RI5), the routine proceeds to step RI6. If the CPU 30 determines that the location of the target line in the sub-scanning direction SD corresponding to the current value of the total line TLN does not indicate the furthest readable position MRP (e.g., NO in step RI5), the routine proceeds to step RI7. In the illustrative embodiment, the location of the target line in the sub-scanning direction SD corresponding to the current value of the total line TLN may indicate a location of a single line in the sub-scanning direction SD located away from the first line FL by the current value of the total line TLN in the sub-scanning direction SD.

In step RI6, the CPU 30 turns the reading end flag REFG on and stores this flag information in the RAM 32. In response to the end of step RI6, the first detection processing (e.g., step RH1) ends.

Figure 16:
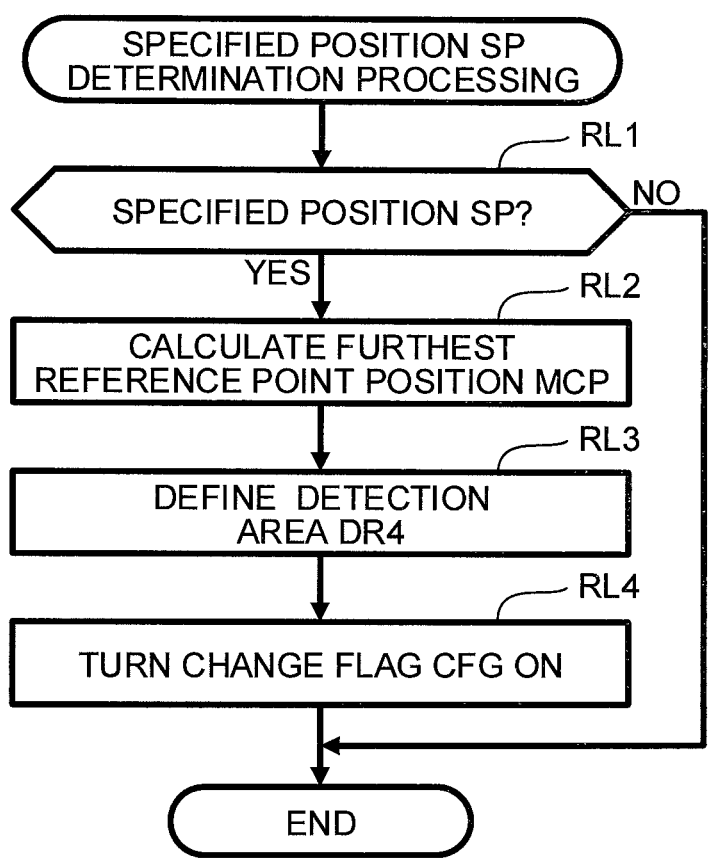
FIG. 16 is a flowchart of specified position determination processing in the illustrative embodiment according to one or more aspects of the disclosure.

If, in step RI5, the CPU 30 makes a negative determination (e.g., NO), in step RI7, the CPU 30 executes specified position SP determination processing (refer to FIG. 16). As illustrated in FIG. 16, in response to start of the specified position SP determination processing (e.g., step RI7), in step RL1, the CPU 30 determines whether the location of the target line in the sub-scanning direction SD corresponding to the current value of the total line TLN indicates the specified position SP. If the CPU 30 determines that location of the target line in the sub-scanning direction SD corresponding to the current value of the total line TLN does not indicate the specified position SP (e.g., NO in step RL1), the specified position SP determination processing (e.g., step RI7) ends. If the CPU 30 determines that the location of the target line in the sub-scanning direction SD corresponding to the current value of the total line TLN indicates the specified position SP, the routine proceeds to step RL2.

In step RL2, the CPU 30 calculates a furthest reference point position MCP (refer to FIG. 27A). More specifically, for example, the CPU 30 calculates, as the furthest reference point position MCP, a location of a certain pixel on the furthest readable position MRP with respect to the main scanning direction MD. The certain pixel may be located on either of the upstream edge USL or the downstream edge DSL that is located closer to the detection area DR3 than the other to the detection area DR3 with respect to the main scanning direction MD.

In step RL3, the CPU 30 defines a detection area DR4 (refer to FIG. 27A). More specifically, for example, the CPU 30 defines, as the detection area DR4, an area that has a length extending downstream from the specified position SP in the sub-scanning direction SD and a width of 31 pixels extending toward the detection area DR2 (e.g., upstream or downstream) from the furthest reference point position MCP in the main scanning direction MD. The CPU 30 stores this information in the RAM 32.

In step RL4, the CPU 30 turns the change flag CFG on and stores this flag information in the RAM 32. In response to the end of step RL4, the specified position SP determination processing (e.g., step RI7) ends.

In response to the end of step RI7, in step RI8, the CPU 30 adds 1 (one) to the line total TLN (refer to FIG. 14). In response to the end of step RI8, the routine proceeds to step RI1.

If, in step RI3, the CPU 30 makes a positive determination ("YES"), in step RI9, the CPU 30 determines whether the first edge count EN1 has a value smaller than the threshold TH. If the CPU 30 determines that the first edge count EN1 has a value greater than or equal to the threshold TH (e.g., NO in step RI9), the routine proceeds to step RI4. If the CPU 30 determines that the first edge count EN1 has a value smaller than the threshold TH (e.g., YES in step RI9), the routine proceeds to step RI10. In the illustrative embodiment, the threshold TH may be 2.

In step RI10, the CPU 30 turns the first flag FG1 on and stores this flag information in the RAM 32.

In step RI11, the CPU 30 stores the current value of the total line TLN in the RAM 32 as a first detection position DP1 with respect to the sub-scanning direction SD. In response to the end of step RI11, the first detection processing (e.g., step RH1) ends. That is, the document GS does not extend any further in the sub-scanning direction SD in the detection area DR1 and the current detection line data DLD represents the document cover CV. In the illustrative embodiment, the first detection position DP1 corresponds to the n-th line from the first line FL ("n" may correspond to the current value of the total line TLN).

Second Detection Processing

Figure 17:
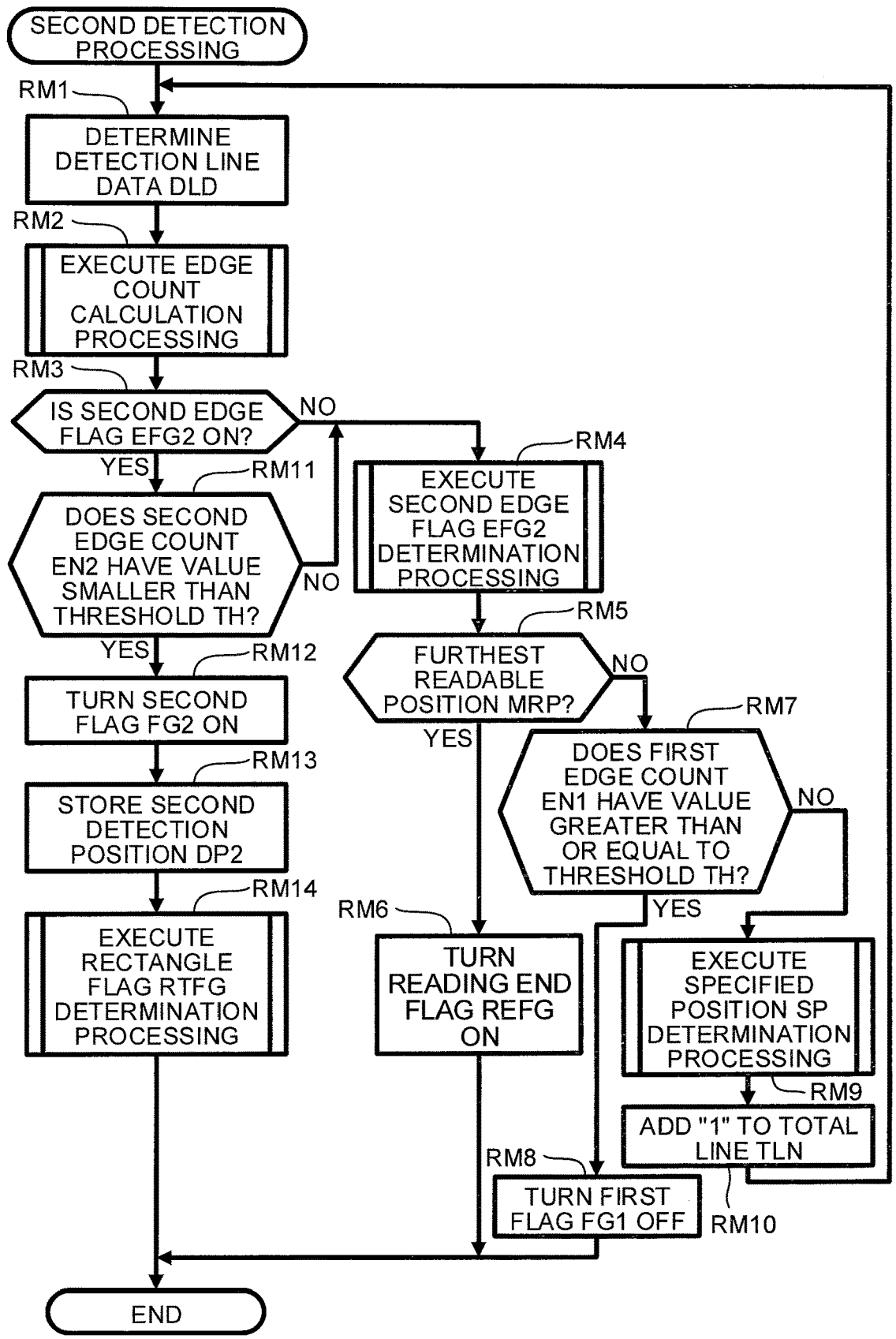
FIG. 17 is a flowchart of second detection processing in the illustrative embodiment according to one or more aspects of the disclosure.

As illustrated in FIG. 17, in response to start of the second detection processing (e.g., step RH3), in step RM1, the CPU 30 determines detection line data DLD. More specifically, for example, the CPU 30 determines, as the detection line data DLD, black and white data WBD included in a single target line that may be an n-th line in the sub-scanning direction SD ("n" may correspond to the current value of the total line TLN), and stores this information in the RAM 32. The current value of the total line TLN when the processing of step RM1 is executed first time after the second detection processing RH3 starts may indicate the value that has been obtained by adding 1 (one) to the previous value of the total line TLN in the processing of RI8 of the first detection processing RH1. The value of the total line TLN determined in step RM1 may indicate the value corresponding to the n-th line from the first line FL, in which the n-th line may be a target line to which the second detection processing (e.g., step RH3) is to be applied.

In step RM2, the CPU 30 executes the edge count calculation processing. More specifically, for example, as illustrated in FIG. 12, the CPU 30 calculates a first edge count EN1, a second edge count EN2, and a third edge count EN3 in a similar manner to the edge count calculation processing in step RG2.

In step RM13, the CPU 30 determines whether the second edge flag EFG2 is on. If the CPU 30 determines that the second edge flag EFG2 is on (e.g., YES in step RM3), the routine proceeds to step RM11. If the CPU 30 determines that the second edge flag EFG2 is off (e.g., NO in step RM3), the routine proceeds to step RM4.

Figure 18:
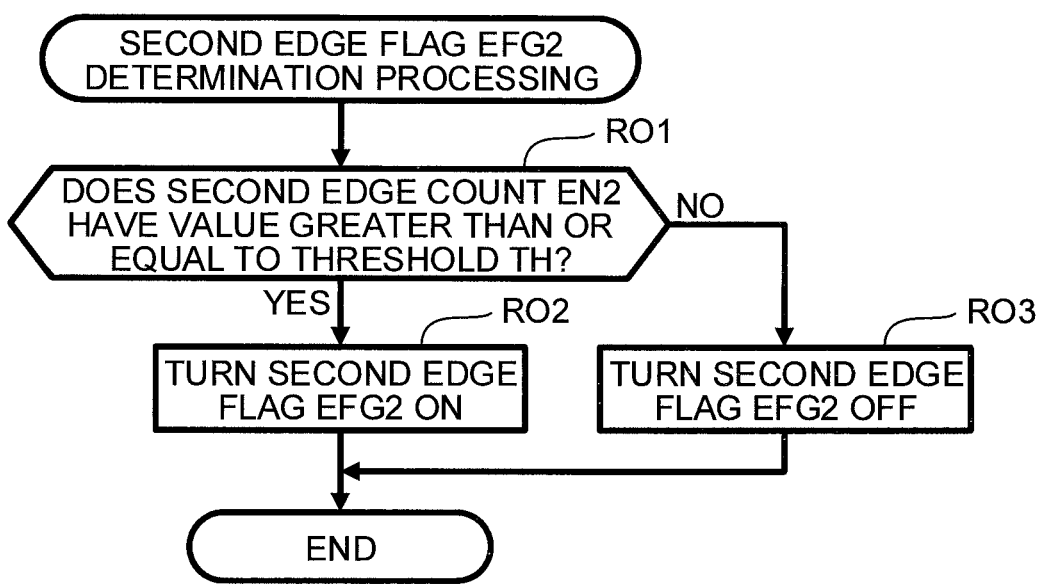
FIG. 18 is a flowchart of second flag determination processing in the illustrative embodiment according to one or more aspects of the disclosure.

If, in step RM3 or RM11, the CPU 30 makes a negative determination (e.g., NO), in step RM4, the CPU 30 executes second edge flag EFG2 determination processing (refer to FIG. 18). As illustrated in FIG. 18, in response to start of the second edge flag EFG2 determination processing (e.g., step RM4), in step RO1, the CPU 30 determines whether the second edge count EN2 has a value greater than or equal to the threshold TH. If the CPU 30 determines that the second edge count EN2 has a value greater than or equal to the threshold TH (e.g., YES in step RO1), the routine proceeds to step R02. If the CPU 30 determines that the second edge count EN2 has a value smaller than the threshold TH (e.g., NO in step RO1), the routine proceeds to step R03. In the illustrative embodiment, the threshold TH may be 2.

If, in step RO1, the CPU 30 makes a positive determination (e.g., YES), in step R02, the CPU 30 turns the second edge flag EFG2 on and stores this flag information in the RAM 32. In response to the end of step R02, the second edge flag EFG2 determination processing (e.g., step RM4) ends.

If, in step RO1, the CPU 30 makes a negative determination (e.g., NO), in step R03, the CPU 30 turns the second edge flag EFG2 off and stores this flag information in the RAM 32. In response to the end of step R03, the second edge flag EFG2 determination processing (e.g., step RM4) ends.

As illustrated in FIG. 17, in response to the end of step RM4, in step RM5, the CPU 30 determines whether the location of the target line in the sub-scanning direction SD corresponding to the current value of the total line TLN indicates the furthest readable position MRP. If the CPU 30 determines that the location of the target line in the sub-scanning direction SD corresponding to the current value of the total line TLN indicates the furthest readable position MRP (e.g., YES in step RM5), the routine proceeds to step RM6. If the CPU 30 determines that the location of the target line in the sub-scanning direction SD corresponding to the current value of the total line TLN does not indicate the furthest readable position MRP (e.g., NO in step RM5), the routine proceeds to step RM7. In the illustrative embodiment, the location of the target line in the sub-scanning direction SD corresponding to the current value of the total line TLN may indicate a location of a single line in the sub-scanning direction SD located away from the first line FL by the current value of the total line TLN in the sub-scanning direction SD.

In step RM6, the CPU 30 turns the reading end flag REFG on and stores this flag information in the RAM 32. In response to the end of step RM6, the second detection processing (e.g., step RH3) ends.

If, in step RM5, the CPU 30 makes a negative determination ("NO"), in step RM7, the CPU 30 determines whether the first edge count EN1 has a value greater than or equal to the threshold TH. If the CPU 30 determines that the first edge count EN1 has a value greater than or equal to the threshold TH (e.g., YES in step RM7), the routine proceeds to step RM8. If the CPU 30 determines that the first edge count EN1 has a value smaller than the threshold TH (e.g., NO in step RM7), the routine proceeds to step RM9. In the illustrative embodiment, the threshold TH may be 2.

In step RM8, the CPU 30 turns the first flag FG1 off and stores this flag information in the RAM 32. In response to the end of step RM8, the second detection processing (e.g., step RH3) ends.

If, in step RM7, the CPU 30 makes a negative determination (e.g., NO), in step RM9, the CPU 30 executes the specified position SP determination processing. Similar to the processing of step RI7 (refer to FIG. 16), in a case where the location of the target line in the sub-scanning direction SD corresponding to the current value of the total line TLN indicates the specified position SP (e.g., YES in RL1), the CPU 30 defines a detection area DR4 and turns the change flag CFG on.

In step RM10, the CPU 30 adds 1 (one) to the line total TLN. In response to the end of step RM10, the routine proceeds to step RM1.

If, in step RM3, the CPU 30 makes a positive determination ("YES"), in step RM11, the CPU 30 determines whether the second edge count EN2 has a value smaller than the threshold TH. If the CPU 30 determines that the second edge count EN2 has a value greater than or equal to the threshold TH (e.g., NO in step RM11), the routine proceeds to step RM4. If the CPU 30 determines that the second edge count EN2 has a value smaller than the threshold TH (e.g., YES in step RM11), the routine proceeds to step RM12.

In step RM12, the CPU 30 turns the second flag FG2 on and stores this flag information in the RAM 32.

In step RM13, the CPU 30 stores the current value of the total line TLN in the RAM 32 as a second detection position DP2 with respect to the sub-scanning direction SD. In the illustrative embodiment, the second detection position DP2 corresponds to the n-th line from the first line FL ("n" may correspond to the current value of the total line TLN).

Figure 19:
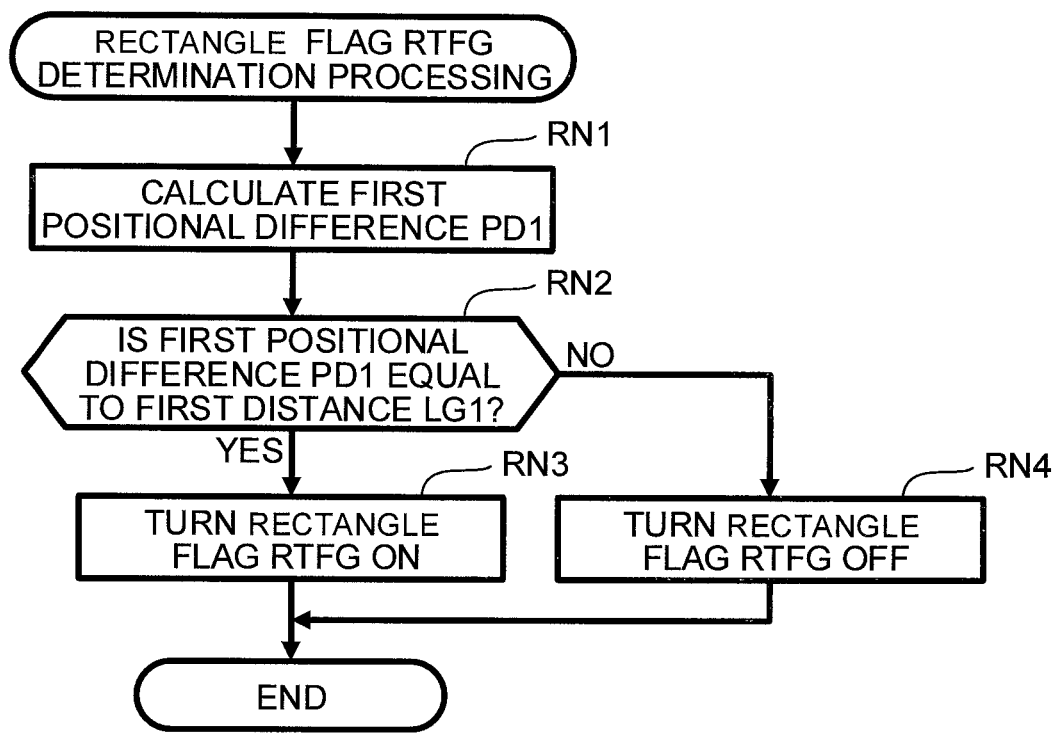
FIG. 19 is a flowchart of rectangle flag determination processing in the illustrative embodiment according to one or more aspects of the disclosure.

In step RM14, the CPU 30 executes rectangle flag RTFG determination processing (refer to FIG. 19). As illustrated in FIG. 19, in response to start of the rectangle flag RTFG determination processing (e.g., step RM14), in step RN1, the CPU 30 calculates a first positional difference PD1. More specifically, for example, the CPU 30 calculates the first positional difference PD1 by subtracting the first detection position DP1 from the second detection position DP2.

In step RN2, the CPU 30 determines whether the first positional difference PD1 is equal to the first distance LG1. If the CPU 30 determines that the first positional difference PD1 is equal to the first distance LG1 (e.g., YES in step RN2), the routine proceeds to step RN3. If the CPU 30 determines that first positional difference PD1 is not equal to the first distance LG1 (e.g., NO in step RN2), the routine proceeds to step RN4.

If, in step RN2, the CPU 30 makes a positive determination (e.g., YES), in step RN3, the CPU 30 turns the rectangle flag RTFG on and stores this flag information in the RAM 32. In response to the end of step RN3, the rectangle flag RTFG determination processing (e.g., step RM14) ends. In response to the end of step RM14, the second detection processing (e.g., step RH3) ends. That is, the document GS does not extend any further in the sub-scanning direction SD in the detection area DR2 and the current detection line data DLD represents the document cover CV.

If, in step RN2, the CPU 30 makes a negative determination (e.g., NO), in step RN4, the CPU 30 turns the rectangle flag RTFG off and stores this flag information in the RAM 32. In response to the end of step RN4, the rectangle flag RTFG determination processing (e.g., step RM14) ends. In response to the end of step RM14, the second detection processing (e.g., step RH3) ends. That is, the document GS does not extend any further in the sub-scanning direction SD in the detection area DR2 and the current detection line data DLD represents the document cover CV.

Third Detection Processing

Figure 20:
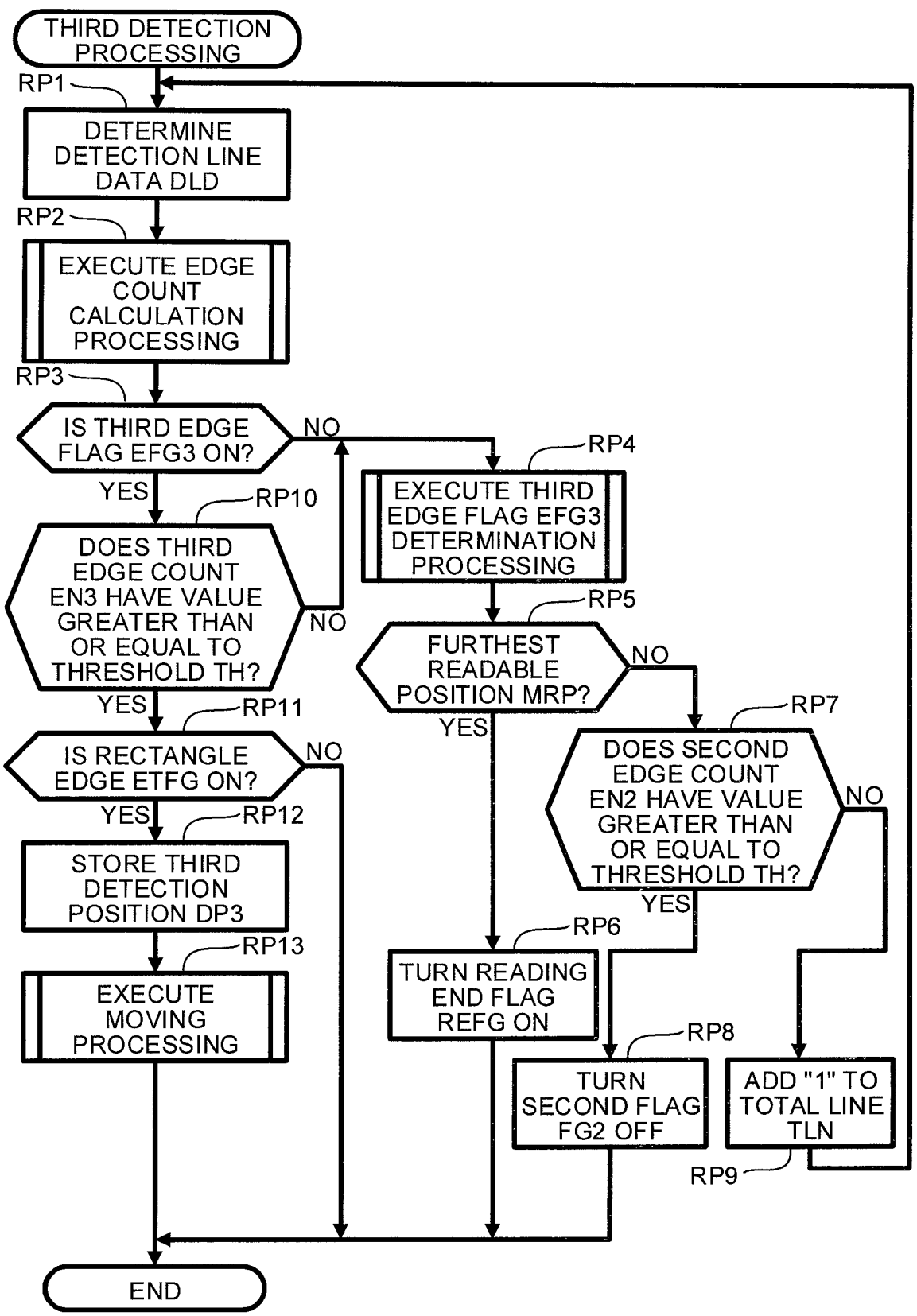
FIG. 20 is a flowchart of third detection processing in the illustrative embodiment according to one or more aspects of the disclosure.

As illustrated in FIG. 20, in response to start of the third detection processing (e.g., step RH7), in step RP1, the CPU 30 determines detection line data DLD. More specifically, for example, the CPU 30 determines, as the detection line data DLD, black and white data WBD included in a single target line that may be an n-th line in the sub-scanning direction SD ("n" may correspond to the current value of the total line TLN), and stores this information in the RAM 32. The current value of the total line TLN when the processing of step RP1 is executed first time after the third detection processing RH7 starts may indicate the value that has been obtained by adding 1 (one) to the previous value of the total line TLN in the processing of RM10 of the second detection processing RH3. The value of the total line TLN determined in step RP1 may indicate the value corresponding to the n-th line from the first line FL, in which the n-th line may be a target line to which the third detection processing (e.g., step RH7) is to be applied.

In step RP2, the CPU 30 executes the edge count calculation processing. More specifically, for example, as illustrated in FIG. 12, the CPU 30 calculates a first edge count EN1, a second edge count EN2, and a third edge count EN3 in a similar manner to the edge count calculation processing in step RG2.

In step RP13, the CPU 30 determines whether the third edge flag EFG3 is on. If the CPU 30 determines that the third edge flag EFG3 is on (e.g., YES in step RP3), the routine proceeds to step RP10. If the CPU 30 determines that the third edge flag EFG3 is off (e.g., NO in step RP3), the routine proceeds to step RP4.

Figure 21:
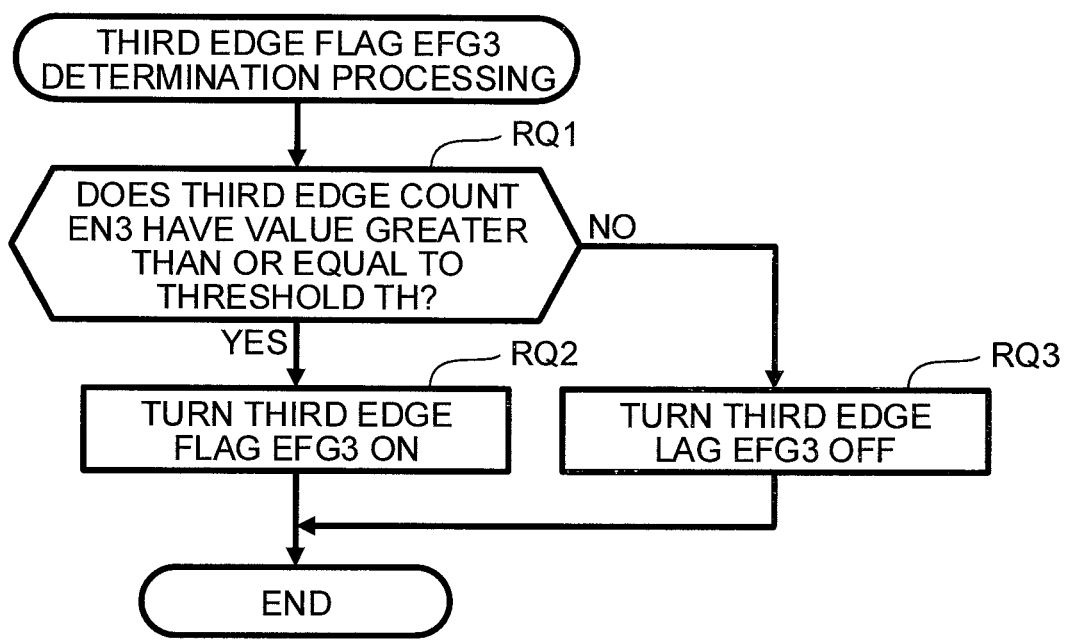
FIG. 21 is a flowchart of third flag determination processing in the illustrative embodiment according to one or more aspects of the disclosure.

In step RP4, the CPU 30 executes third edge flag EFG3 determination processing (refer to FIG. 21). As illustrated in FIG. 21, in response to start of the third edge flag EFG3 determination processing (e.g., step RP4), in step RQ1, the CPU 30 determines whether the third edge count EN3 has a value greater than or equal to the threshold TH. If the CPU 30 determines that the third edge count EN3 has a value greater than or equal to the threshold TH (e.g., YES in step RQ1), the routine proceeds to step RQ2. If the CPU 30 determines that the third edge count EN3 has a value smaller than the threshold TH (e.g., NO in step RQ1), the routine proceeds to step RQ3. In the illustrative embodiment, the threshold TH may be 2.

If, in step RQ1, the CPU 30 makes a positive determination (e.g., YES), in step RQ2, the CPU 30 turns the third edge flag EFG3 on and stores this flag information in the RAM 32. In response to the end of step RQ2, the third edge flag EFG3 determination processing (e.g., step RP4) ends.

If, in step RQ1, the CPU 30 makes a negative determination (e.g., NO), in step RQ3, the CPU 30 turns the third edge flag EFG3 off and stores this flag information in the RAM 32. In response to the end of step RQ3, the third edge flag EFG3 determination processing (e.g., step RP4) ends.

As illustrated in FIG. 20, in response to the end of step RP4, in step RP5, the CPU 30 determines whether the location of the target line in the sub-scanning direction SD corresponding to the current value of the total line TLN indicates the furthest readable position MRP. If the CPU 30 determines that the location of the target line in the sub-scanning direction SD corresponding to the current value of the total line TLN indicates the furthest readable position MRP (e.g., YES in step RP5), the routine proceeds to step RP6. If the CPU 30 determines that the location of the target line in the sub-scanning direction SD corresponding to the current value of the total line TLN does not indicate the furthest readable position MRP (e.g., NO in step RP5), the routine proceeds to step RP7. In the illustrative embodiment, the location of the target line in the sub-scanning direction SD corresponding to the current value of the total line TLN may indicate a location of a single line in the sub-scanning direction SD located away from the first line FL by the current value of the total line TLN in the sub-scanning direction SD.

In step RP6, the CPU 30 turns the reading end flag REFG on and stores this flag information in the RAM 32. In response to the end of step RP6, the third detection processing (e.g., step RH7) ends.

If, in step RP5, the CPU 30 makes a negative determination ("NO"), in step RP7, the CPU 30 determines whether the second edge count EN2 has a value greater than or equal to the threshold TH. If the CPU 30 determines that the second edge count EN2 has a value greater than or equal to the threshold TH (e.g., YES in step RP7), the routine proceeds to step RP8. If the CPU 30 determines that the second edge count EN2 has a value smaller than the threshold TH (e.g., NO in step RP7), the routine proceeds to step RP9. In the illustrative embodiment, the threshold TH may be 2.

In step RP8, the CPU 30 turns the second flag FG2 off and stores this flag information in the RAM 32. In response to the end of step RP8, the third detection processing (e.g., step RH7) ends.

If, in step RP7, the CPU 30 makes a negative determination (e.g., NO), in step RP9, the CPU 30 adds 1 (one) to the line total TLN. In response to the end of step RP9, the routine proceeds to step RP1.

If, in step RP3, the CPU 30 makes a positive determination ("YES"), in step RP10, the CPU 30 determines whether the third edge count EN3 has a value smaller than the threshold TH. If the CPU 30 determines that the third edge count EN3 has a value greater than or equal to the threshold TH (e.g., NO in step RP10), the routine proceeds to step RP4. If the CPU 30 determines that the third edge count EN3 has a value smaller than the threshold TH (e.g., YES in step RP10), the routine proceeds to step RP11. In the illustrative embodiment, the threshold TH may be 2.

In step RP11, the CPU 30 determines whether the rectangle flag RTFG is on. If the CPU 30 determines that the rectangle flag REFG is off (e.g., NO in step RP11), the third detection processing (e.g., step RH7) ends. That is, the document GS does not extend any further in the sub-scanning direction SD in the detection area DR3. If the CPU 30 determines that the rectangle flag REFG is on (e.g., YES in step RP11), the routine proceeds to step RP12.

In step RP12, the CPU 30 stores the current value of the total line TLN in the RAM 32 as a third detection position DP3 with respect to the sub-scanning direction SD. In the illustrative embodiment, the third detection position DP3 corresponds to the n-th line from the first line FL ("n" may correspond to the current value of the total line TLN).

In step RP13, the CPU 30 executes moving processing. More specifically, for example, in a case where the change flag CFG is off, the CPU 30 calculates a first detection position difference DCP1 and a moving distance HTL, and stores a stop position HTP in the RAM 32. If the CPU 30 determines that the CPU 30 has provided a drive instruction to the drive circuit 37 to move the reader 20 to the stop position HTP, the moving processing (e.g., step RP13) ends. In response to the end of step RP13, the third detection processing (e.g., step RH7) ends. That is, the document GS does not extend any further in the sub-scanning direction SD in the detection area DR3 and the current detection line data DLD represents the document cover CV.

Fourth Detection Processing

Figure 22:
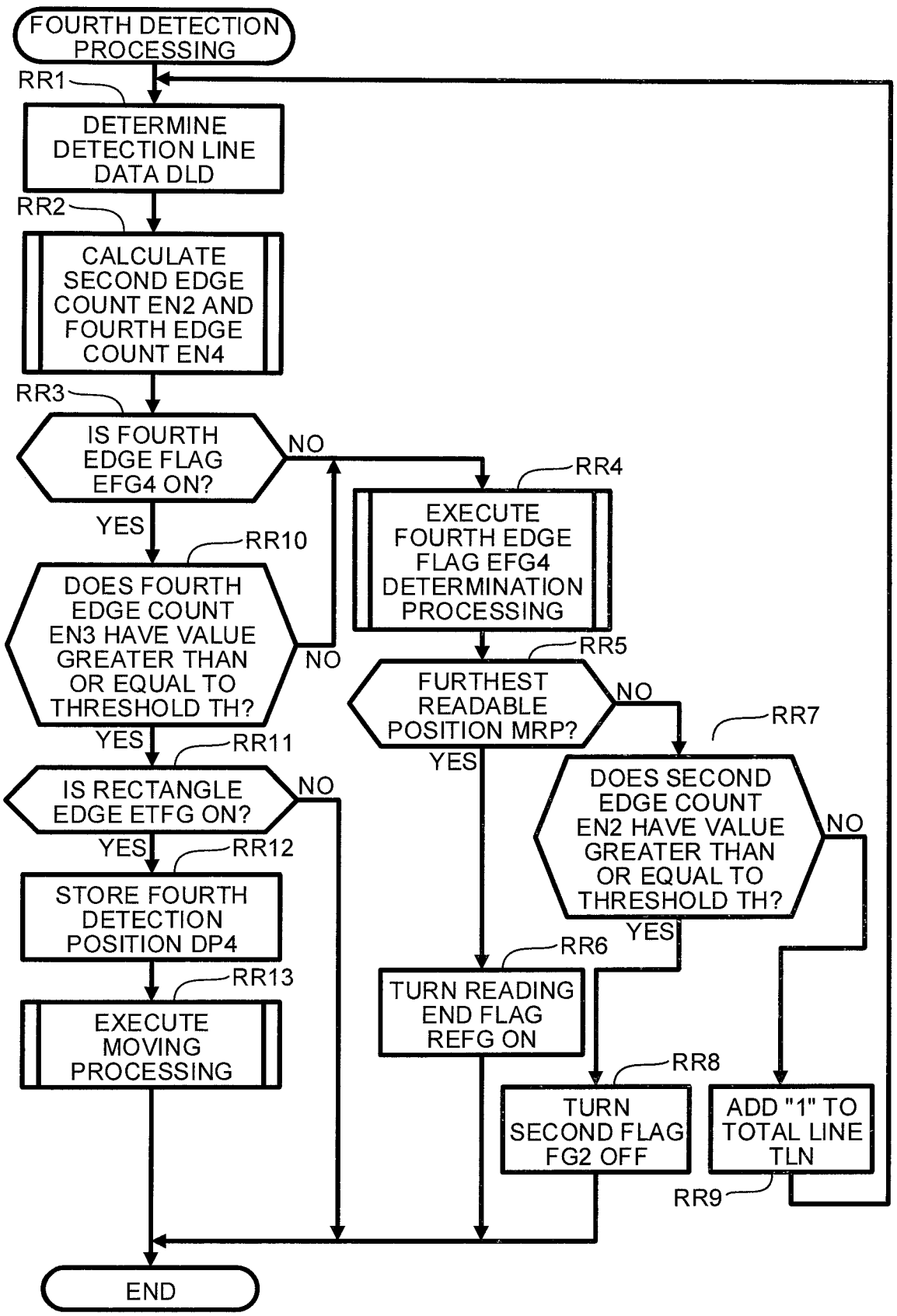
FIG. 22 is a flowchart of fourth detection processing in the illustrative embodiment according to one or more aspects of the disclosure.

As illustrated in FIG. 22, in response to start of fourth detection processing (e.g., step RH8), in step RR1, the CPU 30 determines detection line data DLD. More specifically, for example, the CPU 30 determines, as the detection line data DLD, black and white data WBD included in a single target line that may be an n-th line in the sub-scanning direction SD ("n" may correspond to the current value of the total line TLN), and stores this information in the RAM 32. The current value of the total line TLN when the processing of step RP1 is executed first time after the third detection processing RH8 starts may indicate the value that has been obtained by adding 1 (one) to the previous value of the total line TLN in the processing of RM10 of the second detection processing RH3. The value of the total line TLN determined in step RR1 may indicate the value corresponding to the n-th line from the first line FL, in which the n-th line may be a target line to which the fourth detection processing (e.g., step RH8) is to be applied.

In step RR2, the CPU 30 calculates a second edge count EN2 and a fourth edge count EN4. More specifically, for example, the CPU 30 counts pixels represented by the black and white data WBD having value "1" included in the detection area DR2 in the detection line data DLD, and determines the number of pixels as the second edge count EN2. Further, the CPU 30 counts pixels represented by the black and white data WBD having the value "1" included in the detection area DR4 in the detection line data DLD, and determines the number of pixels as the fourth edge count EN4.

In step RP3, the CPU 30 determines whether the fourth edge flag EFG4 is on. If the CPU 30 determines that the fourth edge flag EFG4 is on (e.g., YES in step RR3), the routine proceeds to step RR10. If the CPU 30 determines that the fourth edge flag EFG4 is off (e.g., NO in step RR3), the routine proceeds to step RR4.

Figure 23:
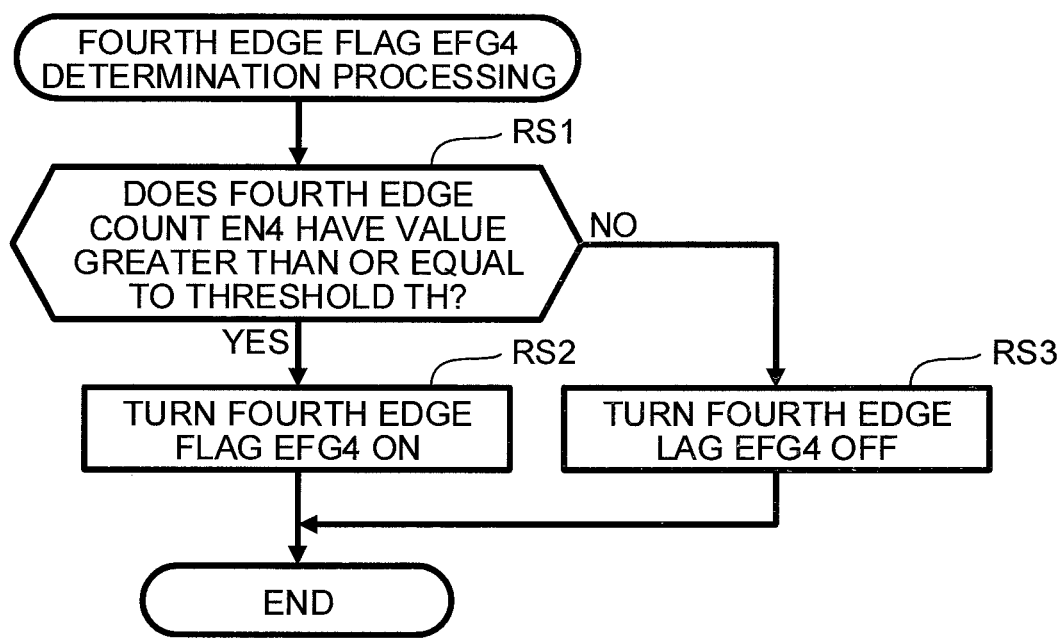
FIG. 23 is a flowchart of fourth flag determination processing in the illustrative embodiment according to one or more aspects of the disclosure.

In step RR4, the CPU 30 executes fourth edge flag EFG4 determination processing (refer to FIG. 23). As illustrated in FIG. 23, in response to start of the fourth edge flag EFG4 determination processing (e.g., step RP4), in step RS1, the CPU 30 determines whether the fourth edge count EN4 has a value greater than or equal to the threshold TH. If the CPU 30 determines that the fourth edge count EN4 has a value greater than or equal to the threshold TH (e.g., YES in step RS1), the routine proceeds to step RS2. If the CPU 30 determines that the fourth edge count EN4 has a value smaller than the threshold TH (e.g., NO in step RS1), the routine proceeds to step RS3. In the illustrative embodiment, the threshold TH may be 2.

If, in step RS1, the CPU 30 makes a positive determination (e.g., YES), in step RS2, the CPU 30 turns the fourth edge flag EFG4 on and stores this flag information in the RAM 32. In response to the end of step RS2, the fourth edge flag EFG4 determination processing (e.g., step RR4) ends.

If, in step RS1, the CPU 30 makes a negative determination (e.g., NO), in step RS3, the CPU 30 turns the fourth edge flag EFG4 off and stores this flag information in the RAM 32. In response to the end of step RS3, the fourth edge flag EFG4 determination processing (e.g., step RR4) ends.

As illustrated in FIG. 22, in response to the end of step RR4, in step RR5, the CPU 30 determines whether the location of the target line in the sub-scanning direction SD corresponding to the current value of the total line TLN indicates the furthest readable position MRP. If the CPU 30 determines that the location of the target line in the sub-scanning direction SD corresponding to the current value of the total line TLN indicates the furthest readable position MRP (e.g., YES in step RR5), the routine proceeds to step RR6. If the CPU 30 determines that the location of the target line in the sub-scanning direction SD corresponding to the current value of the total line TLN does not indicate the furthest readable position MRP (e.g., NO in step RR5), the routine proceeds to step RR7. In the illustrative embodiment, the location of the target line in the sub-scanning direction SD corresponding to the current value of the total line TLN may indicate a location of a single line in the sub-scanning direction SD located away from the first line FL by the current value of the total line TLN in the sub-scanning direction SD.

In step RR6, the CPU 30 turns the reading end flag REFG on and stores this flag information in the RAM 32. In response to the end of step RR6, the fourth detection processing (e.g., step RH8) ends.

If, in step RR5, the CPU 30 makes a negative determination ("NO"), in step RR7, the CPU 30 determines whether the second edge count EN2 has a value greater than or equal to the threshold TH. If the CPU 30 determines that the second edge count EN2 has a value greater than or equal to the threshold TH (e.g., YES in step RR7), the routine proceeds to step RR8. If the CPU 30 determines that the second edge count EN2 has a value smaller than the threshold TH (e.g., NO in step RR7), the routine proceeds to step RR9. In the illustrative embodiment, the threshold TH may be 2.

In step RR8, the CPU 30 turns the second flag FG2 off and stores this flag information in the RAM 32. In response to the end of step RR8, the fourth detection processing (e.g., step RH8) ends.

If, in step RR7, the CPU 30 makes a negative determination (e.g., NO), in step RR9, the CPU 30 adds 1 (one) to the line total TLN. In response to the end of step RR9, the routine proceeds to step RR1.

If, in step RR3, the CPU 30 makes a positive determination ("YES"), in step RR10, the CPU 30 determines whether the fourth edge count EN4 has a value smaller than the threshold TH. If the CPU 30 determines that the fourth edge count EN4 has a value greater than or equal to the threshold TH (e.g., NO in step RR10), the routine proceeds to step RR4. If the CPU 30 determines that the fourth edge count EN4 has a value smaller than the threshold TH (e.g., YES in step RR10), the routine proceeds to step RR11. In the illustrative embodiment, the threshold TH may be 2.

In step RR11, the CPU 30 determines whether the rectangle flag RTFG is on. If the CPU 30 determines that the rectangle flag REFG is off (e.g., NO in step RR11), the fourth detection processing (e.g., step RH8) ends. That is, the document GS does not extend any further in the sub-scanning direction SD in the detection area DR4 and the current detection line data DLD represents the document cover CV. If the CPU 30 determines that the rectangle flag REFG is on (e.g., YES in step RR11), the routine proceeds to step RR12.

In step RR12, the CPU 30 stores the current value of the total line TLN in the RAM 32 as a fourth detection position DP4 with respect to the sub-scanning direction SD. In the illustrative embodiment, the fourth detection position DP4 corresponds to the n-th line from the first line FL ("n" may correspond to the current value of the total line TLN).

In step RR13, the CPU 30 executes moving processing. More specifically, for example, in a case where the change flag CFG is on, the CPU 30 calculates a second detection position difference DCP2 and a moving distance HTL, and stores a stop position HTP in the RAM 32. If the CPU 30 determines that the CPU 30 has provided a drive instruction to the drive circuit 37 to move the reader 20 to the stop position HTP, the moving processing (e.g., step RR13) ends. In response to the end of step RR13, the fourth detection processing (e.g., step RH8) ends. That is, the document GS does not extend any further in the sub-scanning direction SD in the detection area DR4 and the current detection line data DLD represents the document cover CV.

Moving Processing

Figure 24:
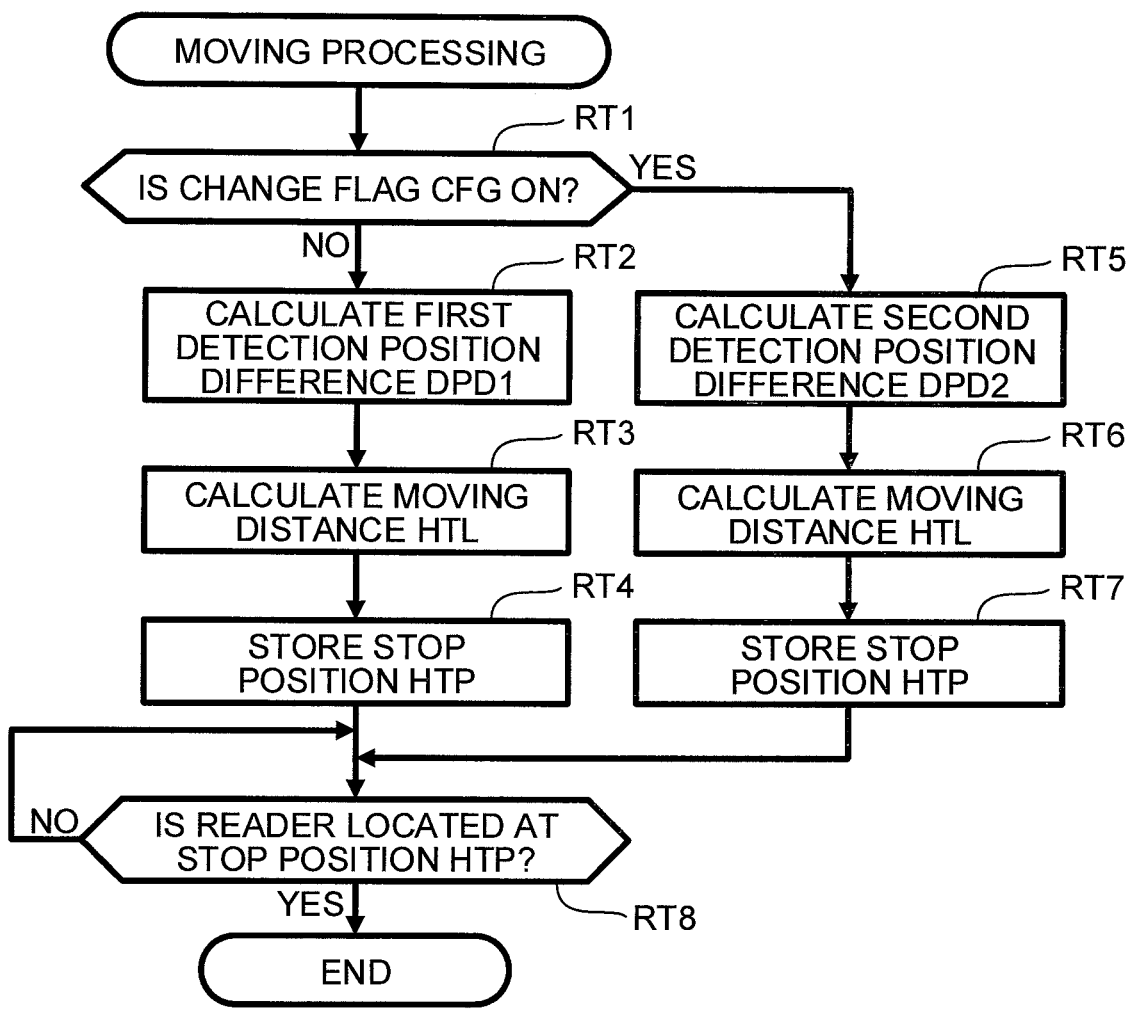
FIG. 24 is a flowchart of moving processing in the illustrative embodiment according to one or more aspects of the disclosure.

As illustrated in FIG. 24, in response to start of the moving processing (e.g., step RP13 or RR13), the CPU 30 determines whether the change flag CFG is on (e.g., step RT1). If the CPU 30 determines that the change flag CFG is on (e.g., YES in step RT1), the routine proceeds to step RT5. If the CPU 30 determines that the change flag CFG is off (e.g., NO in step RT1), the routine proceeds to step RT2.

In step RT2, the CPU 30 calculates a first detection position difference DPD1 (refer to FIG. 26A). More specifically, for example, the CPU 30 calculates the first detection position difference DPD1 by subtracting the value corresponding to the number of lines in the range from the first line FL to the third detection position DP3 with respect to the sub-scanning direction SD from the value corresponding to the number of lines in the range from the first line FL to the specified position SP with respect to the sub-scanning direction SD.

In step RT3, the CPU 30 calculates a moving distance HTL (refer to FIG. 26). More specifically, for example, the CPU 30 calculates the moving distance HTL by multiplying a value obtained by application of the sinusoidal processing to the skewed angle CA by the first detection position difference DPD1 and further multiplying the value obtained by the former multiplication by the value obtained by application of the sinusoidal processing to the skewed angle CA.

In step RT4, the CPU 30 stores the stop position HTP in the RAM 32. More specifically, for example, the CPU 30 determines, as the stop position HTP, a position downstream away from the third detection position DP3 by the moving distance HTL in the sub-scanning direction SD, and stores the determined stop position HTP in the RAM 32. In response to the end of step RT4, the routine proceeds to step RT8.

If, in step RT1, the CPU 30 makes a positive determination (e.g., YES) in step RT5, the CPU 30 calculates a second detection position difference DPD2 (refer to FIG. 27B). More specifically, for example, the CPU 30 calculates the second detection position difference DPD2 by subtracting the value corresponding to the number of lines in the range from the first line FL to the fourth detection position DP4 with respect to the sub-scanning direction SD from the value corresponding to the number of lines in the range from the first line FL to the furthest readable position MRP with respect to the sub-scanning direction SD.

In step RT6, the CPU 30 calculates a moving distance HTL (refer to FIG. 27B). More specifically, for example, the CPU 30 calculates the moving distance HTL by multiplying a value obtained by application of the sinusoidal processing to the skewed angle CA by the second detection position difference DPD2 and further multiplying the value obtained by the former multiplication by the value obtained by application of the sinusoidal processing to the skewed angle CA.

In step RT7, the CPU 30 stores the stop position HTP in the RAM 32. More specifically, for example, the CPU 30 determines, as the stop position HTP, a position downstream away from the fourth detection position DP4 by the moving distance HTL in the sub-scanning direction SD, and stores the determined stop position HTP in the RAM 32.

In step RT8, the CPU 30 determines whether the reader 20 is located at the stop position HTP. More specifically, for example, if the CPU 30 has provided a drive instruction to the drive circuit 37 to move the reader 20 to the stop position HTP, the CPU 30 determines that the reader 20 is located at the stop position HTP (e.g., YES in step RT8) and thus the moving processing (e.g., RT8) ends. If the CPU 30 has provided another drive instruction to the drive circuit 37, the CPU 30 determines that the reader 20 is not located at the stop position HTP (e.g. NO in step RT8) and thus continues the ongoing reading operation. In response to the end of step RT8, the moving processing (e.g., step RP13 or RR13) ends.

Effects Achieved by Illustrative Embodiments

In the illustrative embodiment, in the detection area specification processing (e.g., step RA4) of the leading-edge detection processing (e.g., step R3), if the CPU 30 determines that the skewed angle CA indicates "no skew", the CPU 30 turns the "no skew" flag DFG on and defines a detection area DR1, a detection area DR2, a detection area DR3, and a specified position SP. In the document detection processing (e.g., step R4), if the CPU 30 determines that the "no skew" flag DFG is on, the CPU 30 executes the non-skewed document detection processing (e.g., step RF2). In the non-skewed document detection processing (e.g., step RF2), if all of the first edge count EN1, the second edge count EN2, and the third edge count EN3 have a value greater than or equal to the threshold TH, the CPU 30 turns the document edge flag EFG on and adds 1 (one) to the total line TLN. In the non-skewed document detection processing (e.g., step RF2), if the document edge flag EFG is on and all of the first edge count EN1, the second edge count EN2, and the third edge count EN3 have a value smaller than the threshold TH, the non-skewed document detection processing (e.g., step RF2) ends. That is, the document GS does not extend any further in the sub-scanning direction SD and the current detection line data DLD represents the document cover CV. In the document detection processing (e.g., step R4), if the CPU 30 determines that the "no skew" flag DFG is off, the CPU 30 calculates a first distance LG1 and executes the skewed document detection processing (e.g., step RF4). In the skewed document detection processing (e.g., step RF4), the CPU 30 executes the first detection processing (e.g., step RH1), the second detection processing (e.g., step RH2) and either of the third detection processing (e.g., step RH7) or the fourth detection processing (e.g., step RH8). In the first detection processing (e.g., step RH1), if the CPU 30 determines that the first edge count EN1 has a value greater than or equal to the threshold TH, the CPU 30 turns the first edge flag EFG1 on and adds 1 (one) to the total line TLN. In the first detection processing (e.g., step RH1), if the CPU 30 determines that the first edge flag EFG1 is on and the first edge count EN1 has a value smaller than the threshold TH, the CPU 30 turns the first flag FG1 on and stores a first detection position DP1. That is, the document GS does not extend any further in the sub-scanning direction SD in the detection area DR1 and the current detection line data DLD represents the document cover CV. In the second detection processing (e.g., step RH3), if the CPU 30 determines that the second edge count EN2 has a value greater than or equal to the threshold TH, the CPU 30 turns the second edge flag EFG2 on and adds 1 (one) to the total line TLN. In the second detection processing (e.g., step RH3), if the CPU 30 determines that the second edge flag EFG2 is on and the second edge count EN2 has a value smaller than the threshold TH, the CPU 30 turns the second flag FG2 and stores a second detection position DP2. That is, the document GS does not extend any further in the sub-scanning direction SD in the detection area DR2 and the current detection line data DLD represents the document cover CV. If the CPU 30 determines the first positional difference PD1 is equal to the first distance LG1, the CPU 30 turns the rectangle flag RTFG on. In the third detection processing (e.g., step RH7), if the CPU 30 determines that the third edge count EN3 has a value greater than or equal to the threshold TH, the CPU 30 turns the third edge flag EFG3 on and adds 1 (one) to the total line TLN. In the third detection processing (e.g., step RH7), if the CPU 30 determines that the third edge flag EFG3 is on and the third edge count EN3 has a value smaller than the threshold TH, the CPU 30 determines whether the rectangle flag RTFG is on. That is, the document GS does not extend any further in the sub-scanning direction SD in the detection area DR3 and the current detection line data DLD represents the document cover CV. In the third detection processing (e.g., step RH7), if the CPU 30 determines that the rectangle flag RTFG is off, the third detection processing (e.g., step RH7) ends. If the CPU 30 determines that the rectangle flag RTFG is on, the CPU 30 stores a third detection position DP3, calculates a first detection position difference DCP1 and a moving distance HTL, and continues an ongoing reading operation until the reader 20 reaches the stop position HTP. According to the illustrative embodiment, in either of these cases where a document GS is placed on the document table DT with its leading edge extending parallel to the main scanning direction MD or where a document GS is placed on the document table DT with its leading edge extending not parallel to the main scanning direction MD, the CPU 30 may execute respective appropriate different ending processing. In a case where a document GS is placed on the document table DT with its leading edge extending not parallel to the main scanning direction MD and the rectangle flag RTFG is on, the CPU 30 may continue an ongoing reading operation until the reader 20 reaches the stop position HTP. Consequently, the image scanner SM may read a document GS successfully.

In the first detection processing (e.g., step RH1), the CPU 30 executes the specified position SP determination processing (e.g., step RI7). In the second detection processing (e.g., step RH3), the CPU 30 executes the specified position SP determination processing (e.g., step RM9). In the specified position SP determination processing (e.g., step RI7 or RM9), if the CPU 30 determines that the location of the target line in the sub-scanning direction SD corresponding to the current value of the total line TLN indicates the specified position SP, the CPU 30 defines a detection area DR4 and turns the change flag CFG on. In the skewed document detection processing (e.g., step RF4), if the CPU 30 determines that the change flag CFG is on, the CPU 30 executes the fourth detection processing (e.g., step RH8). If the CPU 30 determines that the change flag CFG is off, the CPU 30 executes the third detection processing (e.g., step RH7). In the fourth detection processing (e.g., step RH8), if the CPU 30 determines that the fourth edge count EN4 has a value greater than or equal to the threshold TH, the CPU 30 turns the fourth edge flag EFG4 on and adds 1 (one) to the total line TLN. In the fourth detection processing (e.g., step RH8), if the CPU 30 determines that the fourth edge flag EFG4 is on and the fourth edge count EN4 has a value smaller than the threshold TH, the CPU 30 determines whether the rectangle flag RTFG is on. That is, the document GS does not extend any further in the sub-scanning direction SD in the detection area DR4 and the current detection line data DLD represents the document cover CV. In the fourth detection processing (e.g., step RH8), if the CPU 30 determines that the rectangle flag RTFG is off, the fourth detection processing (e.g., step RH8) ends. If the CPU 30 determines that the rectangle flag RTFG is on, the CPU 30 stores a fourth detection position DP4, calculates a second detection position difference DCP2 and a moving distance HTL, and continues an ongoing reading operation until the reader 20 reaches the stop position HTP. Therefore, if a document GS extends further downstream than the specified position SP in the sub-scanning direction SD, the CPU 30 executes the fourth detection processing (e.g., step RH8) to detect the document GS in the detection area DR4. Further, if the CPU 30 determines that the rectangle flag RTFG is on, the CPU 30 continues an ongoing reading operation until the reader 20 reaches the stop position HTP. Consequently, the image scanner SM may read the document GS successfully.

Alternative Embodiments

While the disclosure has been described in detail with reference to the specific embodiment thereof, this is merely an example, and various changes, arrangements and modifications may be applied therein without departing from the spirit and scope of the disclosure.

In other embodiments, for example, the image scanner SM may be applied to a multifunction device including a printer. In the illustrative embodiment, the CIS is used as the reader 20. Nevertheless, in other embodiments, for example, the reader 20 may include a charge coupled device ("CCD") and may be configured to move in the sub-scanning direction SD. In another example, the reader 20 may include a CCD, a light source, and a mirror. In such a case, the CCD may be fixed and the light source and mirror may move in the sub-scanning direction SD.

In the illustrative embodiment, the CPU 30 defines a detection area DR1, a detection area DR2, and a detection area DR3 based on the skewed angle CA, the leading edge HL, the upstream edge USL, and the downstream edge that are calculated based on the leading-edge data HA. Nevertheless, in other embodiments, for example, another method may be used for defining the detection area DR1, the detection area DR2, and the detection area DR3. In still other embodiments, for example, the CPU 30 may define a detection area DR1, a detection area DR2, and a detection area DR4 but not define a detection area DR3. In such a case, the CPU 30 may define, as the detection area DR4, an area that has a length extending downstream from the leading-edge data end position HADP in the sub-scanning direction SD and a width of 31 pixels extending toward the detection area DR2 (e.g., upstream or downstream) from the furthest reference point position MCP in the main scanning direction MD. The CPU 30 may store this information in the RAM 32.

In the illustrative embodiment, if the CPU 30 determines that the rectangle flag RTFG determined based on the first detection position DP1 is on, the CPU 30 executes the moving processing (e.g., step RP13). If the CPU 30 determines that the rectangle flag RTFG determined based on the second detection position DP2 is on, the CPU 30 executes the moving processing (e.g., step RR13). Nevertheless, in other embodiments, for example, in response to another condition being met, the CPU 30 may execute the moving processing (e.g., step RP13 or RR13). In still other embodiments, for example, if the CPU 30 determines that the rectangle flag RTFG is on and the third detection position DP3 is determined as a location downstream away from the second detection position DP2 by the first distance LG1 in the sub-scanning direction SD, the CPU 30 may execute the moving processing (e.g., step RP13 or RR13).

In the illustrative embodiment, the moving distance HTL is calculated by multiplying a value obtained by application of the sinusoidal processing to the skewed angle CA by the first detection position difference DPD1 or the second detection position difference DPD2 and further multiplying the value obtained by the former multiplication by the value obtained by application of the sinusoidal processing to the skewed angle CA. Nevertheless, in other embodiments, for example, the moving distance HTL may be predetermined in accordance with the degree of the skewed angle CA.

In the illustrative embodiment, the first distance LG1 is calculated by multiplying a value obtained by application of the tangent processing to the skewed angle CA by a distance between a midpoint of the detection area DR1 in the main scanning direction MD and a midpoint of the detection area DR2 in the main scanning direction MD. Nevertheless, in other embodiments, for example, the first distance LG1 may be predetermined in accordance with the degree of the skewed angle CA.

What is claimed is:

1. An image scanner comprising:
   a document table configured to support a document;
   a document cover configured to be opened and closed selectively to change between an open state in which the document cover exposes the document table and a closed state in which the document cover covers the document table;
   a reader including a line image sensor extending along a main scanning direction, the reader configured to read an image using the line image sensor to generate a plurality of read image data items, wherein the reader is configured to, in response to reading the document supported by the document table, generate, as one of the plurality of read image data items, document data representing a portion of the document, and in response to reading a surface of the document cover in the closed state, generate, as another of the plurality of read image data items, document cover data representing a portion of the document cover;
   a moving unit configured to move the line image sensor in a sub-scanning direction perpendicular to the main scanning direction; and
   a controller configured to:
   generate the plurality of read image data items by the reader while causing the moving unit to move the line image sensor downstream in the sub-scanning direction, the plurality of read image data items including leading-edge image data generated by a reading operation executed from a reading start position to a leading-edge area end position located downstream away from the reading start position by a first predetermined distance in the sub-scanning direction,
   detect a document leading edge extending with respect to the main scanning direction and two document side edges each extending with respect to the sub-scanning direction based on the leading-edge image data;
   define, based on the document side edges, a middle area at a middle portion of the document supported by the document table in the main scanning direction and two side areas each between a corresponding one of the document side edges and the middle area and closer to the respective document side edges than to the middle area; and
   in a case where the document leading edge extends parallel to the main scanning direction, end the reading operation for a non-skewed document to a target read image data line, the target read image data line consisting of some of the plurality of read image data items and located downstream from the leading-edge area end position in the sub-scanning direction; and
   in a case where the document leading-edge of the document does not extend parallel to the main scanning direction, end the reading operation for a skewed document to the target read image data line,
   wherein, for non-skewed document, the controller is configured to end the reading operation in response to change of a type of the target read image data line from the document data to the document cover data in all of the middle area and the side areas in the sub-scanning direction; and wherein, for skewed document, the controller is configured to:

determine, in the middle area and the side areas, sequentially a first change position, a second change position, and a third change position in the sub-scanning direction, at each of which the type of the target read image data line changes from the document data to the document cover data in the sub-scanning direction;

determine, based on the first change position and the second change position, whether the document supported by the document table has a rectangular shape; and based on the determination result as to whether the document supported by the document table has a rectangular shape and the third change position, end the reading operation.

2. The image scanner according to claim 1,
wherein the side areas include a first area and a second area,
wherein the first change position is determined in the first area, the first area extends toward the middle area from a first reference point position along the main scanning direction by a second predetermined distance, wherein the first reference point position is on one of the document side edges extending from a location closer to the reading start position than a location from where the other document side edge extends in the sub-scanning direction and indicates a location of the first reference point position in the main scanning direction that corresponds to a location of the leading-edge area end position in the sub-scanning direction,
wherein the third change position is determined in the second area, the second area extends toward the middle area from a third reference point position in the main scanning direction by the second predetermined distance, wherein the third reference point position is a location away from the leading edge by a distance obtained by multiplying a distance between the document side edges by a predetermined ratio and on the other of the document side edges extending from the location farther from the reading start position than the location from where the one document side edge extends in the sub-scanning direction, the predetermined ratio is equal to a value obtained by dividing a dimension of a longer side of a standard-sized document by a dimension of a shorter side of the standard-sized document,
wherein the second change position is determined in the middle area, the middle area extends upstream and downstream in the main scanning direction by the second predetermined distance with respect to a second reference point position that is a midpoint between the first reference point position and the third reference point position, and
wherein, for skewed document, the controller is further configured to execute calculating a first moving distance based on the third reference point position and the third change position,
wherein the controller is further configured to:
in a case where the controller determines that the document supported by the document table does not have a rectangular shape, end the reading operation in response to determining the third change position; and
in a case where the controller determines that the document supported by the document table has a rectangular shape, end the reading operation in response to the moving unit moving the line image sensor downward from the third change position by the first moving distance in the sub-scanning direction.

3. The image scanner according to claim 2, wherein the controller is further configured to:
calculate a skewed angle of the document leading edge relative to the main scanning direction,
calculate the first moving distance by multiplying a value obtained by application of sinusoidal processing to the skewed angle by a distance between the third reference point position and the third change position in the sub-scanning direction and further multiplying the value obtained by the former multiplication by the value obtained by application of the sinusoidal processing to the skewed angle.

4. The image scanner according to claim 3, wherein the controller is further configured to:
calculate a first distance by multiplying a distance between the first area and the middle area in the main scanning direction by a value obtained by application of tangent processing to the skewed angle; and
in a case, for a skewed document, where a distance between the first change position and the second change position in the sub-scanning direction is equal to the first distance, determine that the document supported by the document table has a rectangular shape, and
in a case, for skewed document, where the distance between the first change position and the second change position in the sub-scanning direction is not equal to the first distance, determine that the document supported by the document table does not have a rectangular shape.

5. The image scanner according to claim 4,
wherein the reader is further configured to read the image in a range in which the line image sensor moves by the moving unit from the reading start position to a furthest readable position, and
wherein, in a case where, for skewed document, the controller does not determine the third change position in any of one or more target read image data lines that consist of some of the plurality of read image data items included in a range from the leading-edge area end position to the third reference position in the sub-scanning direction, the controller is configured to determine a fourth area that extends toward the middle area from a furthest reference position by the second predetermined distance in the sub-scanning direction, wherein the furthest reference position is on the document side edge closer to the third area than the other document side edge to the third area and indicates a location of the furthest reference position in the main scanning direction that corresponds to a location of the furthest readable position in the sub-scanning direction; and
wherein, in a case where, for skewed document, the controller does not determine the third change position in any of the one or more target read image data lines, the controller is configured to, for skewed document:

determine, in the fourth area, a fourth change position at which type of the read image data line changes from the document data to the document cover data in the sub-scanning direction; and end the reading operation based on the fourth change position and the determination result as to whether the document has a rectangular shape.

6. The image scanner according to claim 5, wherein the controller is further configured to:

calculate a second moving distance based on the furthest reference point position and the fourth change position, and in a case, for skewed document, where the controller does not determine the third change position in any of the one or more of target read image data lines and the controller further determines that the document does not have a rectangular shape, end the reading operation in response to determining the fourth change position; and in a case, for skewed document, where the controller does not determine the third change position in any of the one or more of target read image data lines and the controller further determines that the document has a rectangular shape, end the reading operation in response to the moving unit moving the line image sensor downstream from the fourth change position by the second moving distance in the sub-scanning direction.

* * * * *